Figure 1:
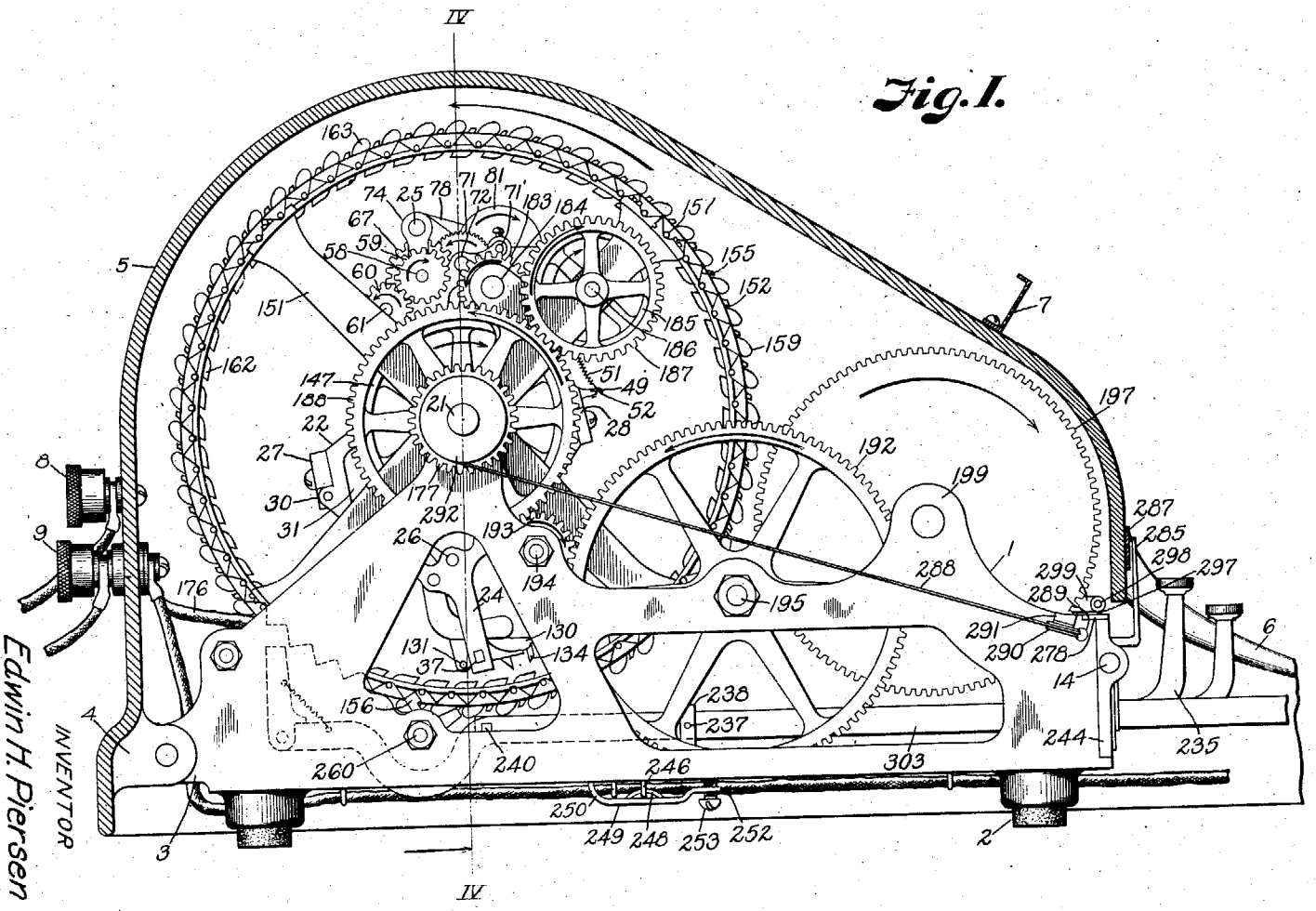

E. H. PIERSEN.

TELEGRAPH TRANSMITTER.

APPLICATION FILED FEB. 9, 1917.

Reissued July 6, 1920.

14,910.

15 SHEETS—SHEET 1.

INVENTOR

Edwin H. Piersen

BY Arthur C. Brown

ATTORNEY

E. H. PIERSEN.
TELEGRAPH TRANSMITTER.
APPLICATION FILED FEB. 9, 1917.
Reissued July 6, 1920.
14,910.
15 SHEETS—SHEET 2.
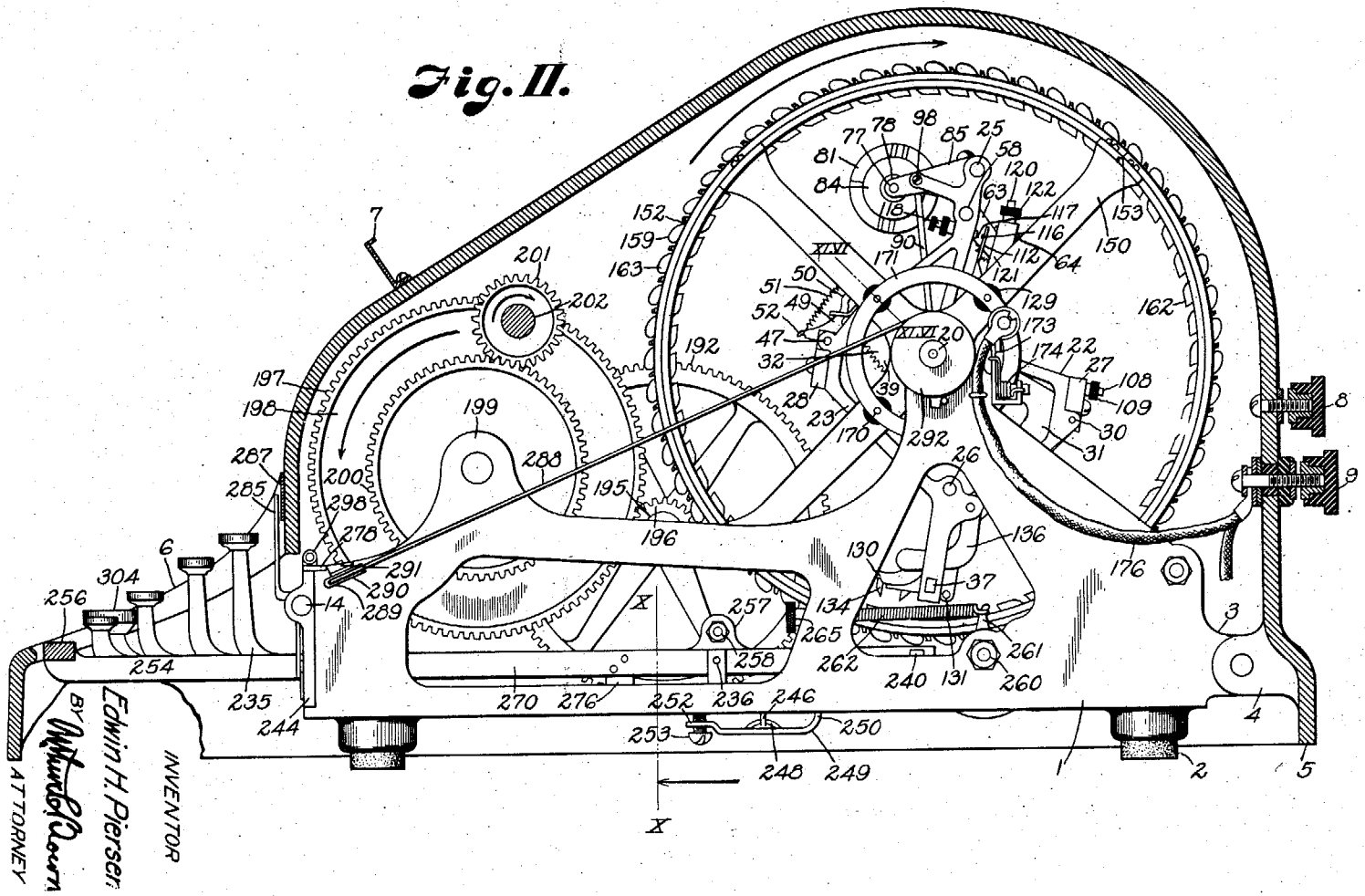
Fig. II.
INVENTOR
Edwin H. Piersen
BY Arthur L. Brown
ATTORNEY E. H. PIERSEN.
TELEGRAPH TRANSMITTER.
APPLICATION FILED FEB. 9, 1917.
Reissued July 6, 1920.
14,910.
15 SHEETS—SHEET 3.
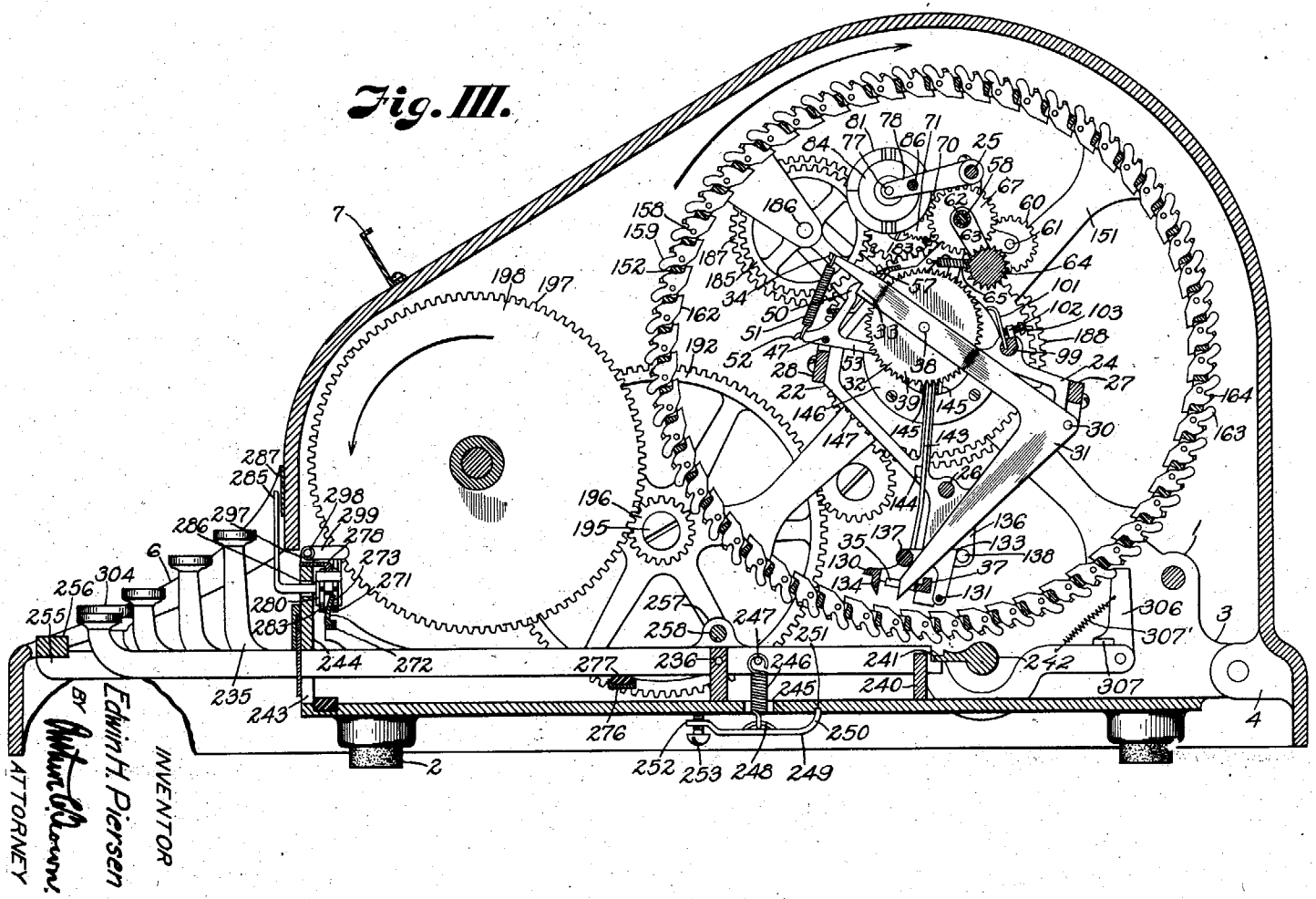
Fig. III.
INVENTOR
Edwin H. Piersen
BY Arthur C. Brown
ATTORNEY E. H. PIERSEN.
TELEGRAPH TRANSMITTER.
APPLICATION FILED FEB. 9, 1917.
Reissued July 6, 1920.
14,910.
15 SHEETS—SHEET 4.
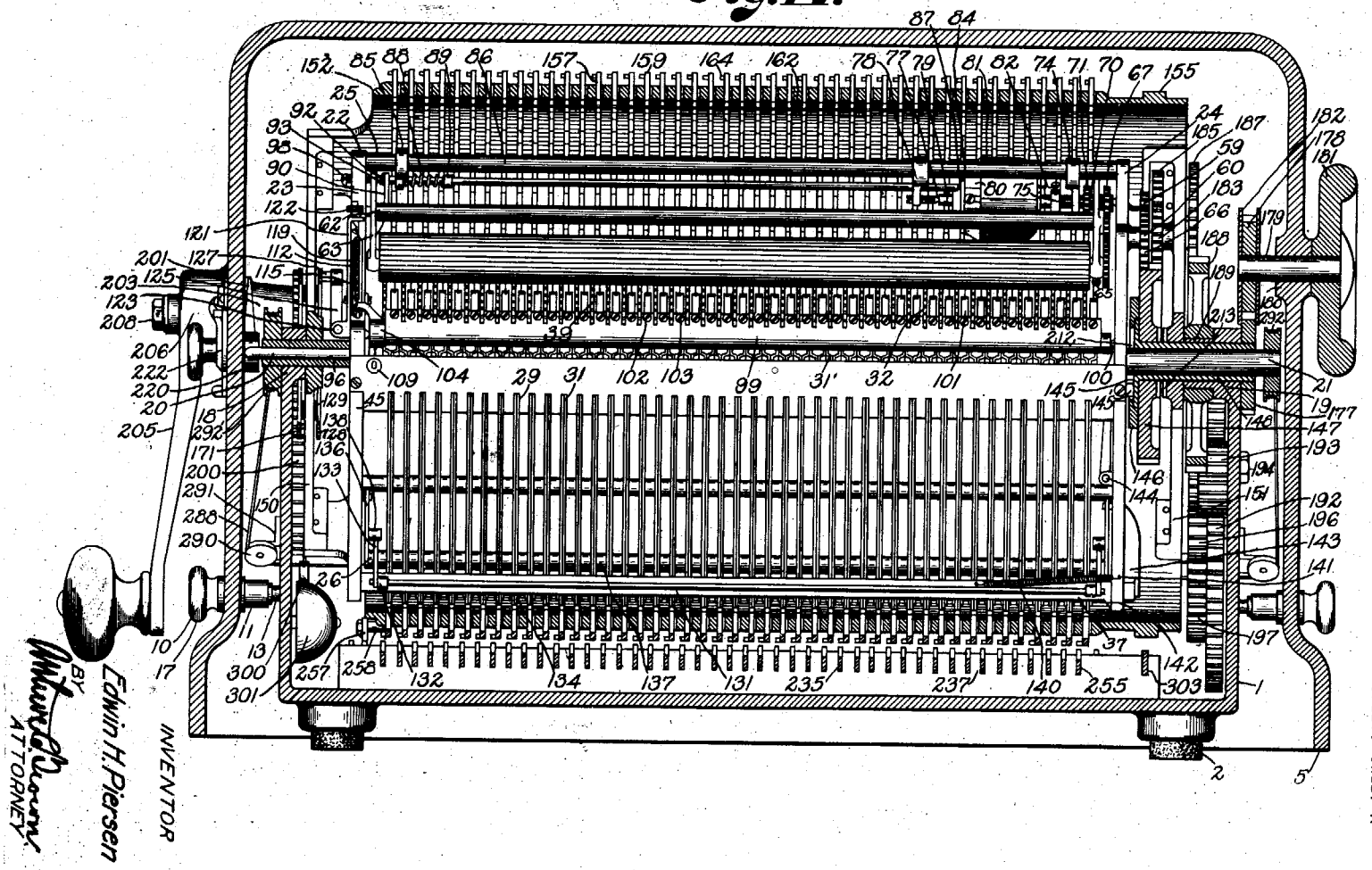
Fig. IV.
INVENTOR
Edwin H. Piersen
BY
Arthur C. Brown
ATTORNEY E. H. PIERSEN.
TELEGRAPH TRANSMITTER.
APPLICATION FILED FEB. 9, 1917.
Reissued July 6, 1920.
14,910.
15 SHEETS—SHEET 5.
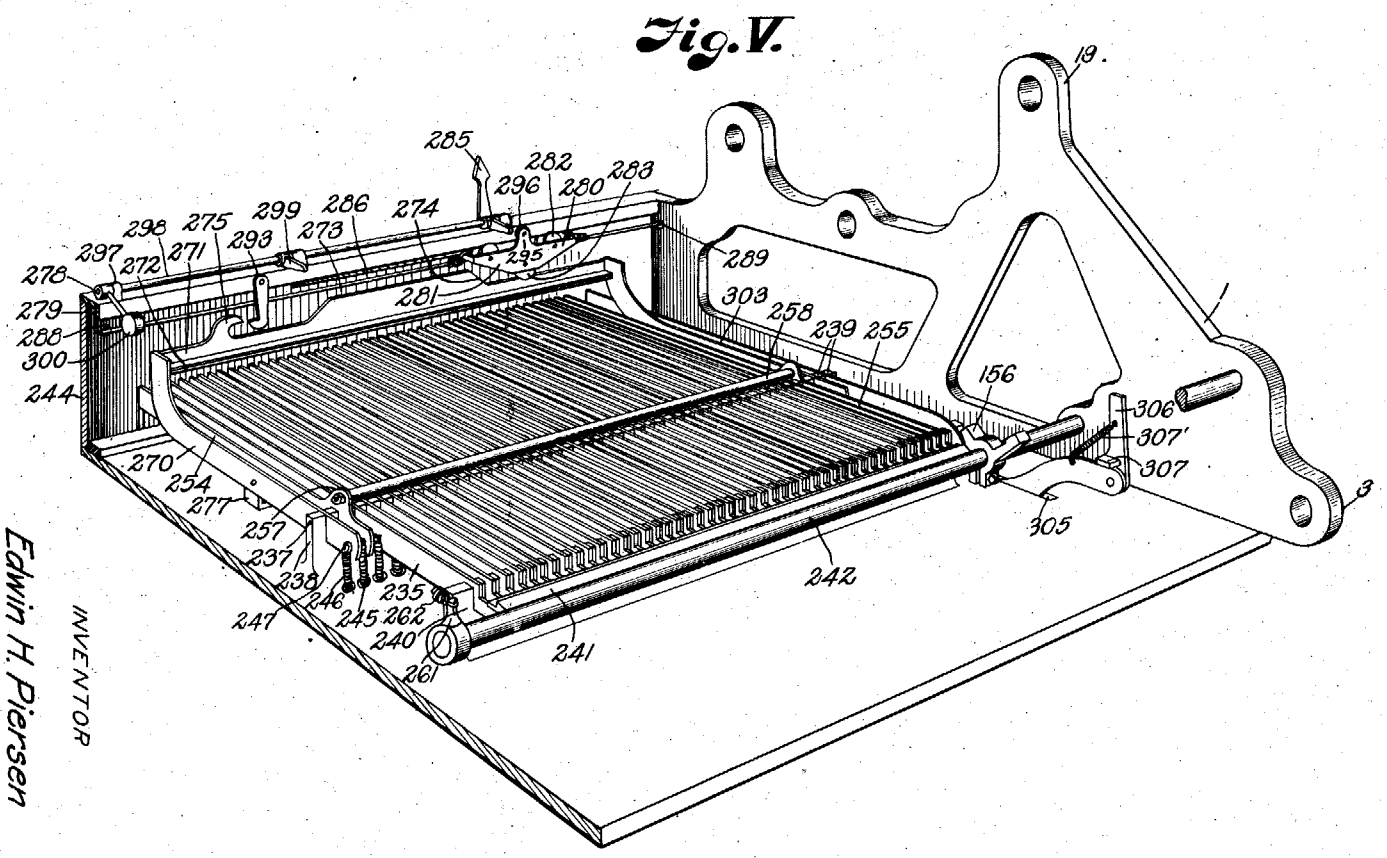
Fig. V.
INVENTOR
Edwin H. Piersen
BY Arthur C. Brown
ATTORNEY E. H. PIERSEN.
TELEGRAPH TRANSMITTER.
APPLICATION FILED FEB. 9, 1917.
Reissued July 6, 1920.
14,910.
15 SHEETS—SHEET 6.
Fig. VII.
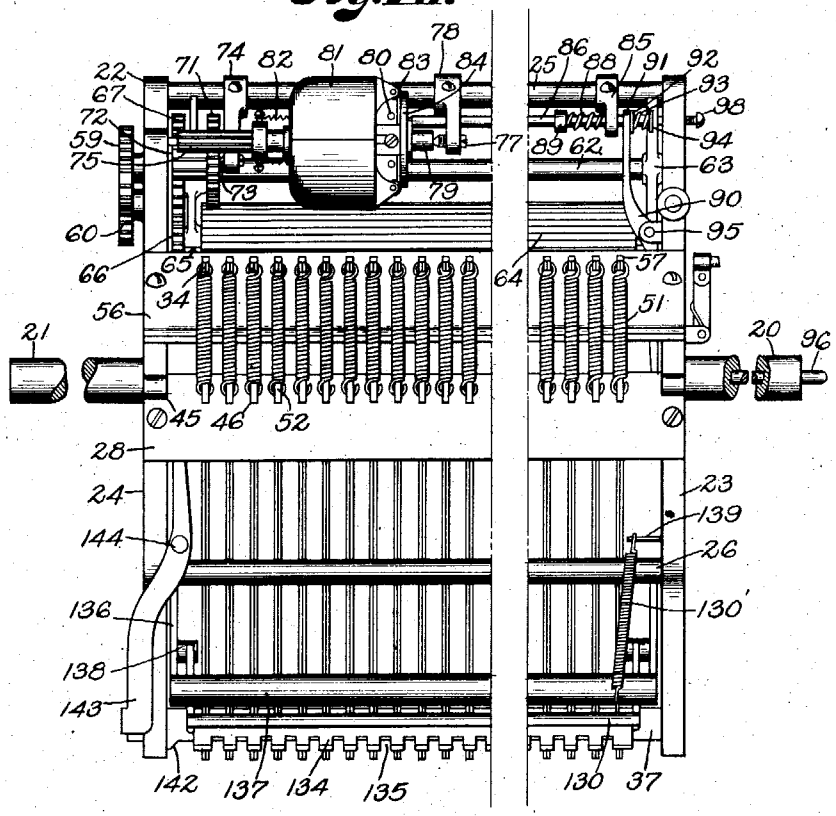
Fig. VI.
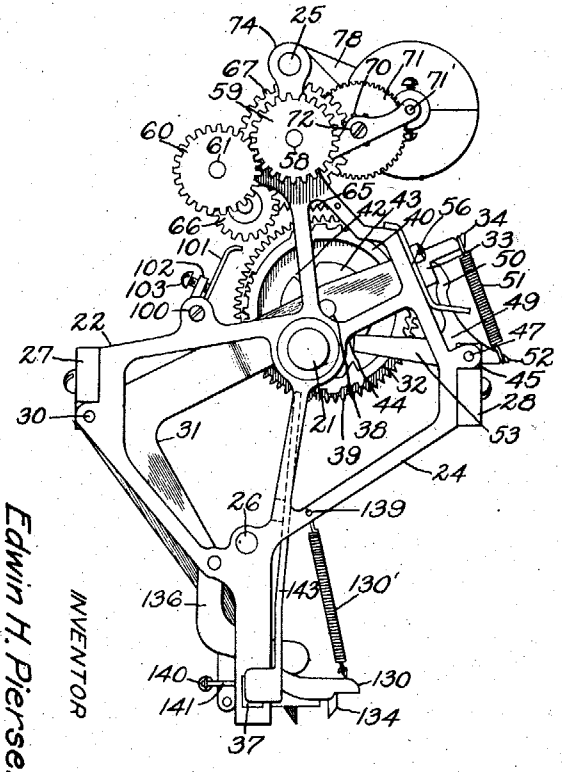
INVENTOR
Edwin H. Piersen
BY Arthur C. Brown
ATTORNEY E. H. PIERSEN.
TELEGRAPH TRANSMITTER.
APPLICATION FILED FEB. 9, 1917.
Reissued July 6, 1920.
14,910.
15 SHEETS—SHEET 7.
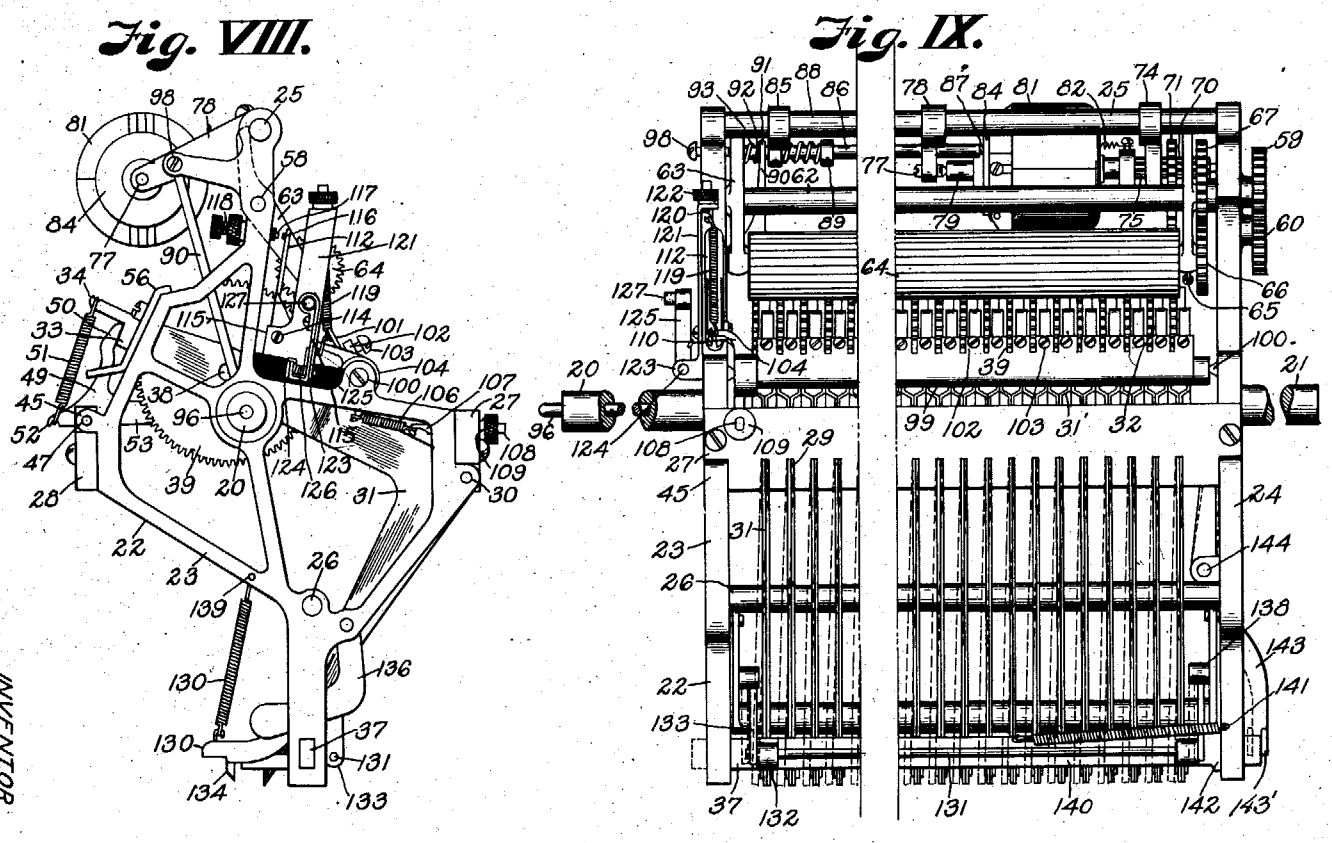
INVENTOR
Edwin H. Piersen
BY Arthur C. Brown
ATTORNEY E. H. PIERSEN.
TELEGRAPH TRANSMITTER.
APPLICATION FILED FEB. 9, 1917.
Reissued July 6, 1920.
14,910.
15 SHEETS—SHEET 8.
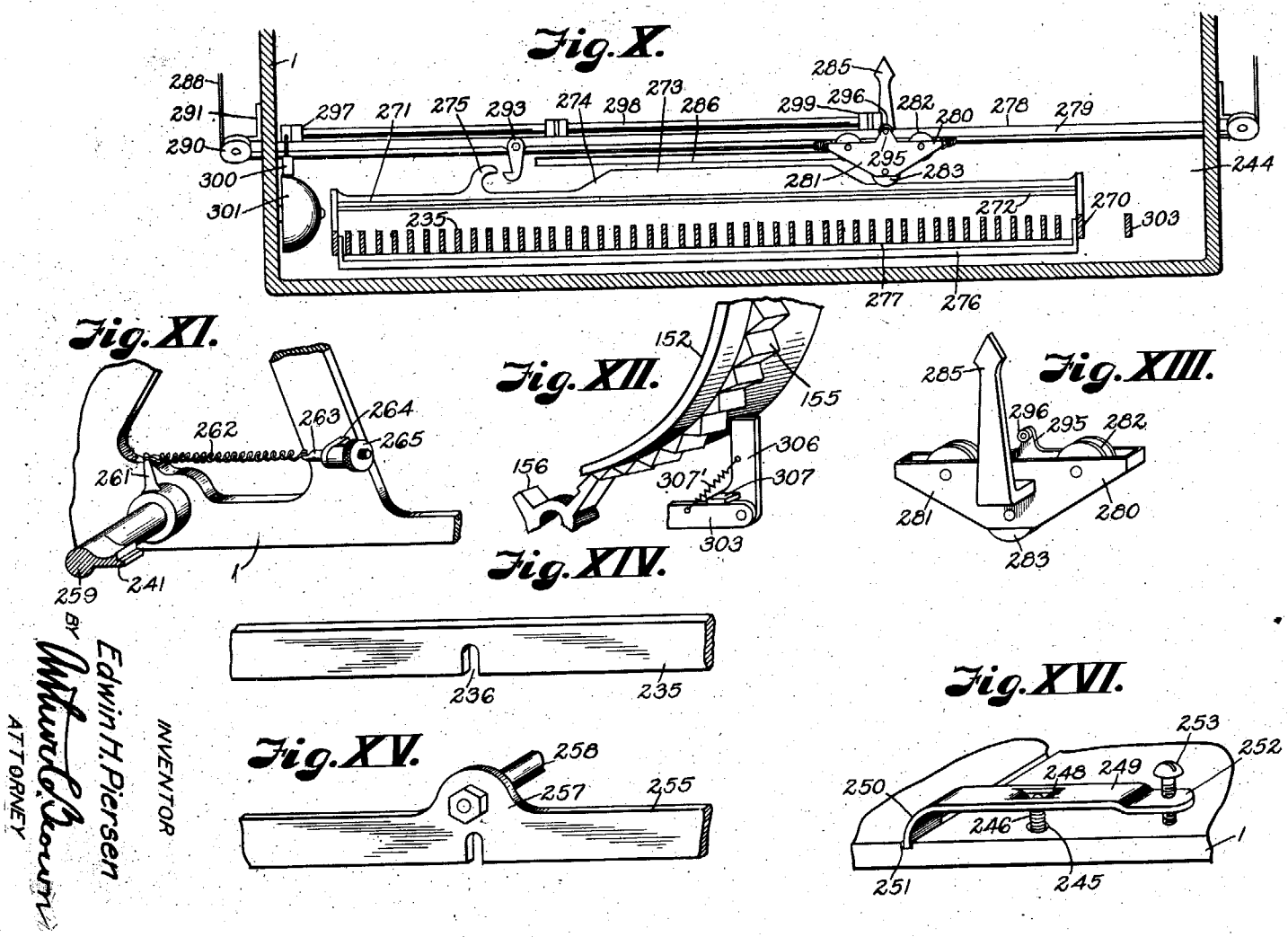
INVENTOR
Edwin H. Piersen
BY Arthur C. Brown
ATTORNEY E. H. PIERSEN.
TELEGRAPH TRANSMITTER.
APPLICATION FILED FEB. 9, 1917.
Reissued July 6, 1920.
14,910.
15 SHEETS—SHEET 9.
Fig. XVII.
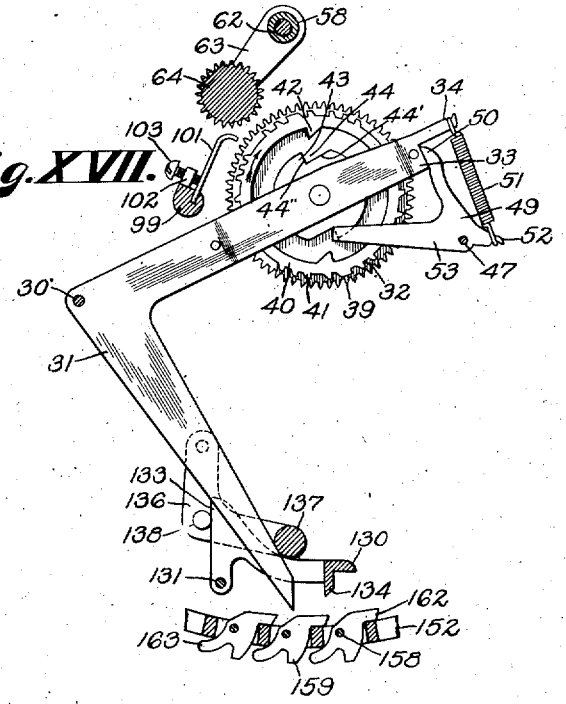
Fig. XIX.
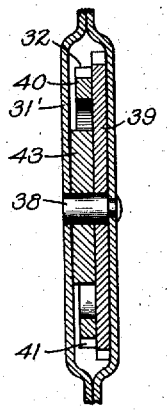
Fig. XVIII.
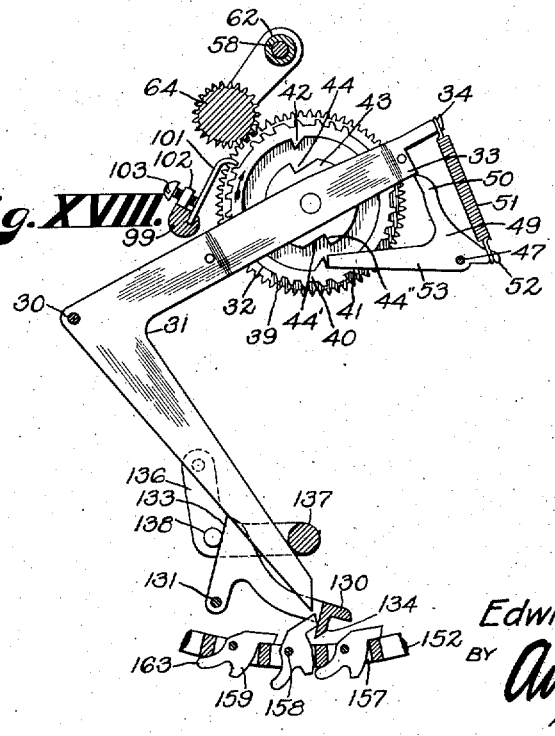
INVENTOR
Edwin H. Piersen
BY Arthur C. Brown,
ATTORNEY E. H. PIERSEN
TELEGRAPH TRANSMITTER.
APPLICATION FILED FEB. 9, 1917.
Reissued July 6, 1920.
14,910.
15 SHEETS—SHEET 10.
Fig. XXI.
Fig. XX.
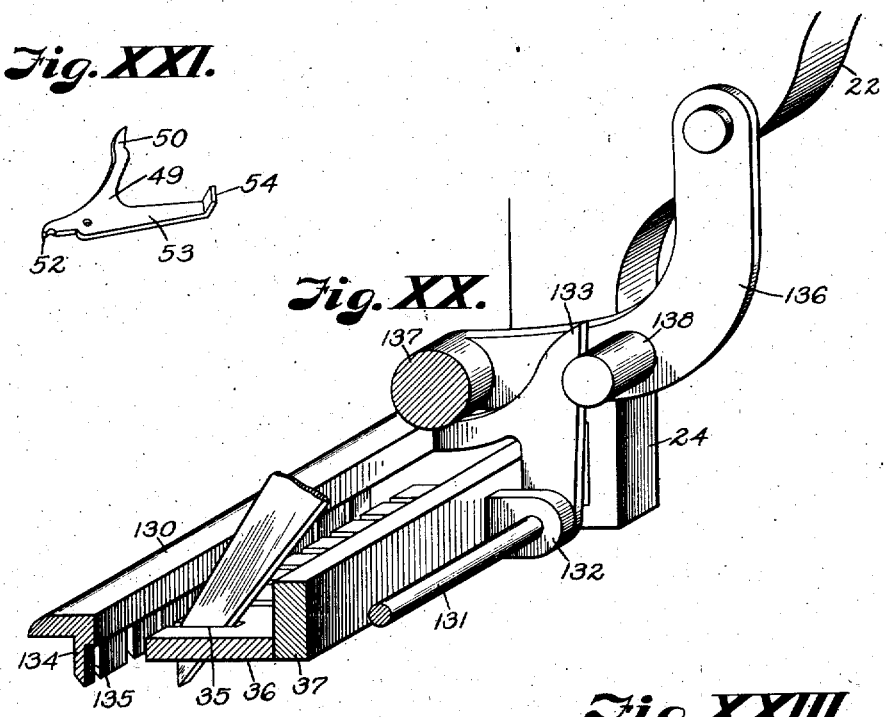
Fig. XXII.
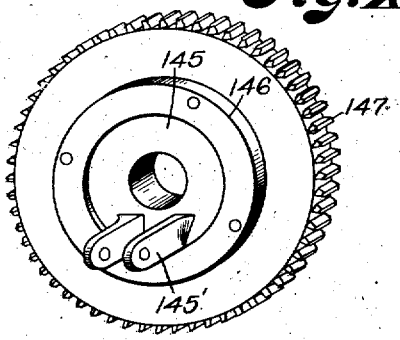
Fig. XXIII.
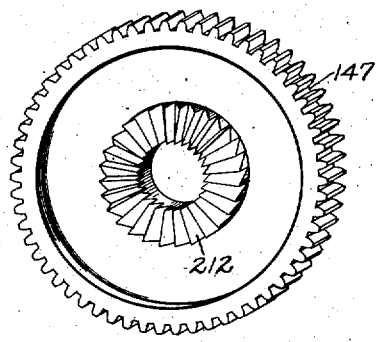
Fig. XXIV.
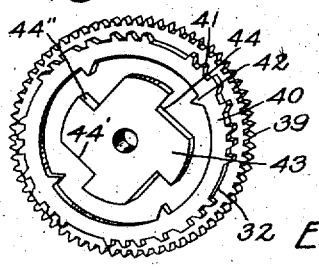
INVENTOR
Edwin H. Piersen
BY Arthur C. Brown
ATTORNEY E. H. PIERSEN.
TELEGRAPH TRANSMITTER.
APPLICATION FILED FEB. 9, 1917.
Reissued July 6, 1920.
14,910.
15 SHEETS—SHEET 11.
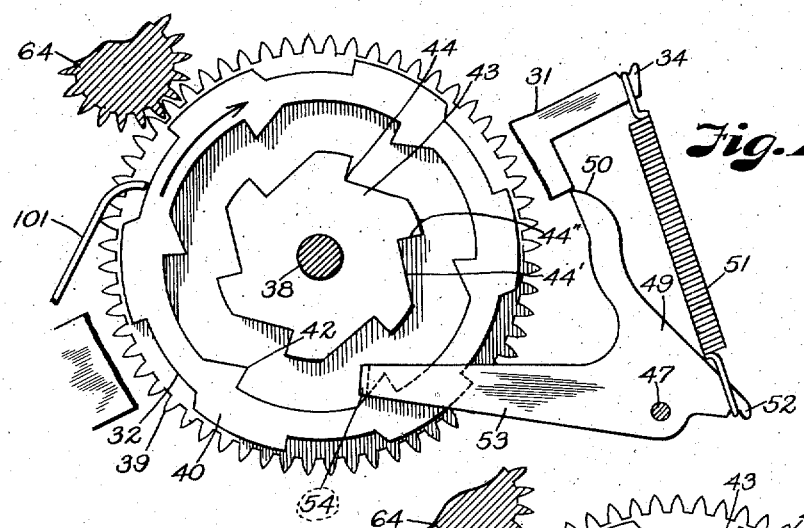
Fig. XXV.
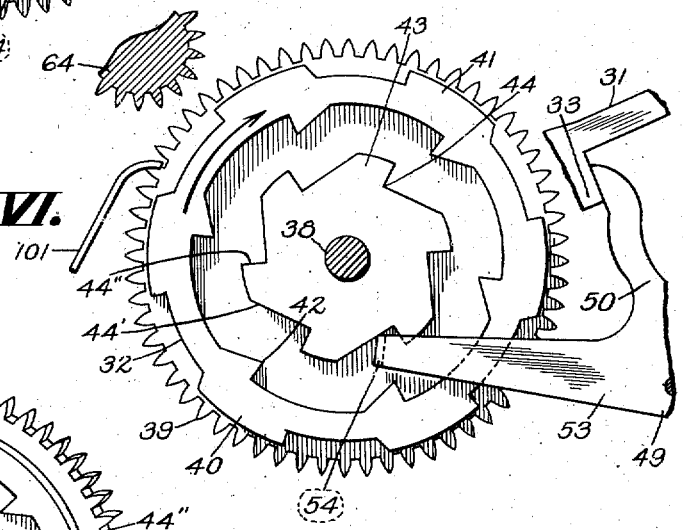
Fig. XXVI.
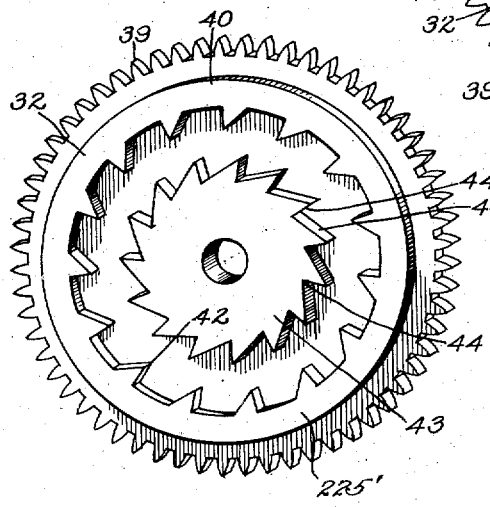
Fig. XXVII.
INVENTOR
Edwin H. Piersen
BY Arthur E. Brown
ATTORNEY E. H. PIERSEN.
TELEGRAPH TRANSMITTER.
APPLICATION FILED FEB. 9, 1917.
Reissued July 6, 1920.
14,910.
15 SHEETS—SHEET 12.
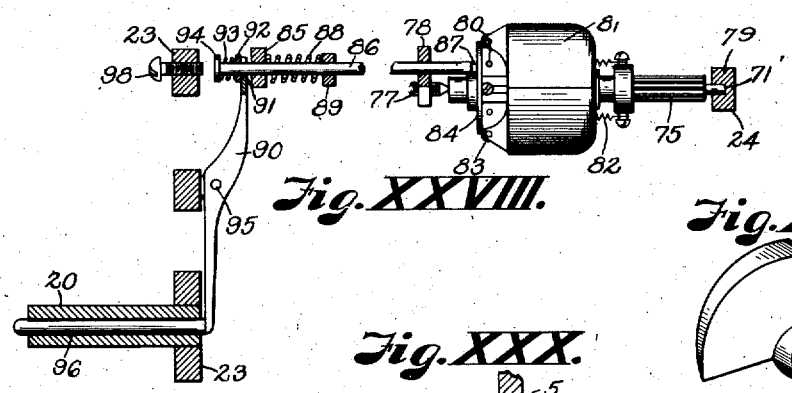
Fig. XXVIII.
Fig. XXIX.
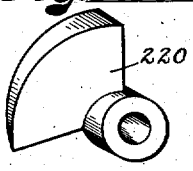
Fig. XXX.
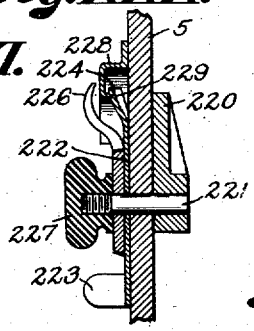
Fig. XXXI.
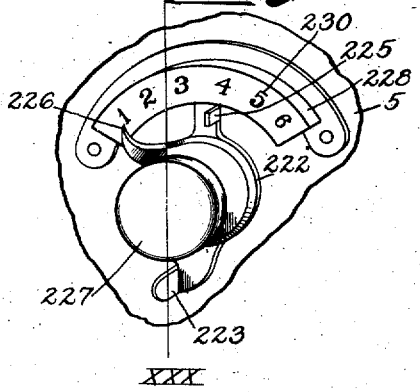
Fig. XXXII.
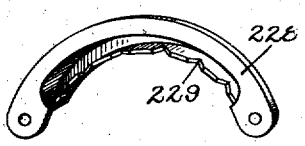
Fig. XXXIII.
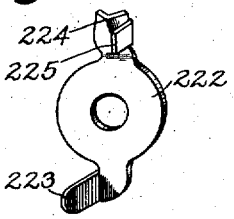
Fig. XXXIV.
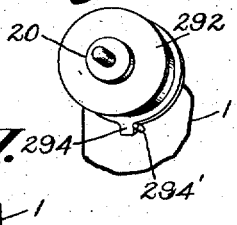
Fig. XXXV.
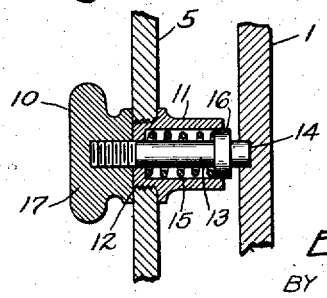
INVENTOR.
Edwin H. Piersen.
BY Arthur C. Brown
ATTORNEY E. H. PIERSEN.
TELEGRAPH TRANSMITTER.
APPLICATION FILED FEB. 9, 1917
Reissued July 6, 1920.
14,910.
15 SHEETS—SHEET 13.
Fig. XXXVI.
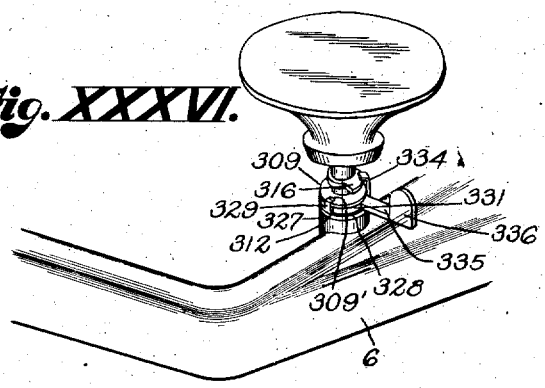
Fig. XXXVII.
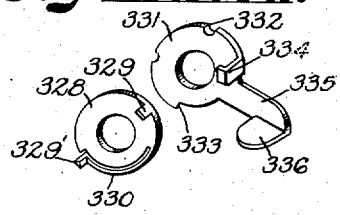
Fig. XXXVIII.
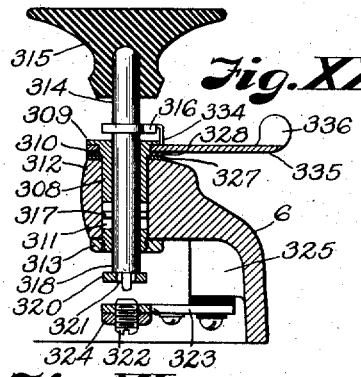
Fig. XXXIX.
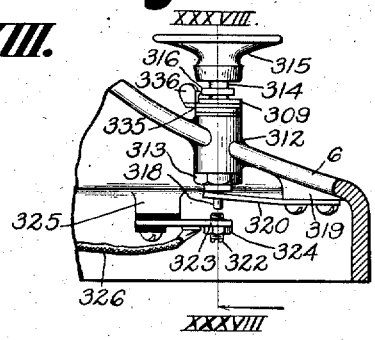
Fig. XL.
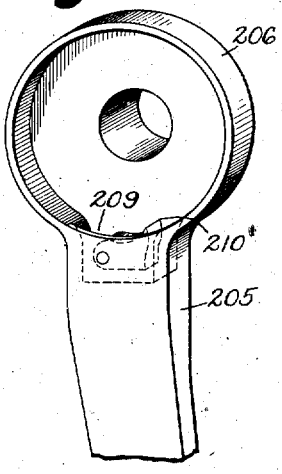
Fig. XLII.
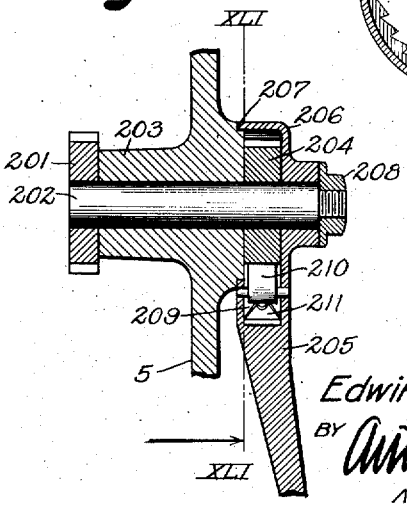
Fig. XLI.
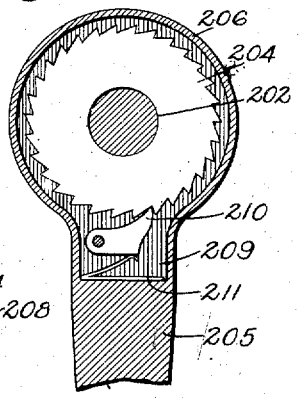
INVENTOR.
Edwin H. Piersen
BY Arthur C. Brown
ATTORNEY E. H. PIERSEN.
TELEGRAPH TRANSMITTER.
APPLICATION FILED FEB. 9, 1917.
Reissued July 6, 1920.
14,910.
15 SHEETS—SHEET 14.
Fig. XLIII.
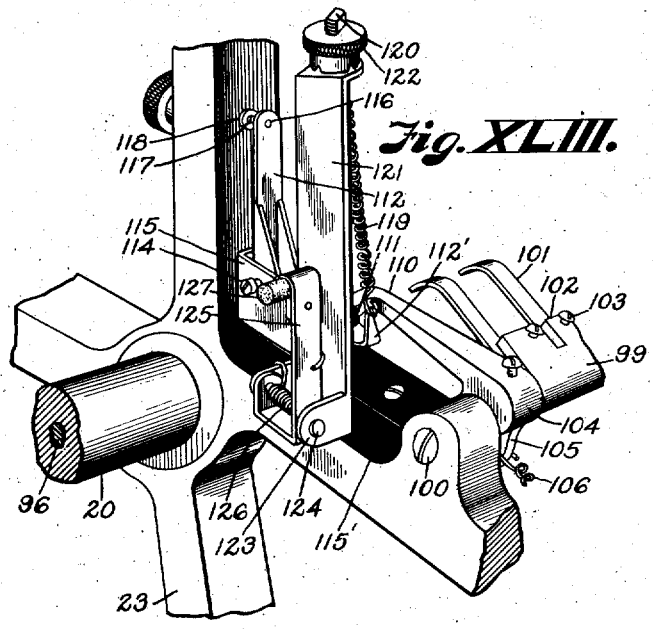
Fig. XLVI.
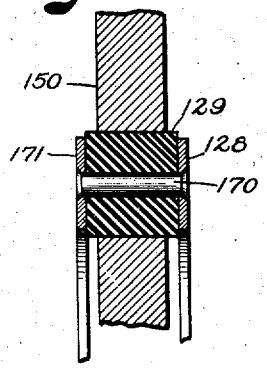
Fig. XLIV.
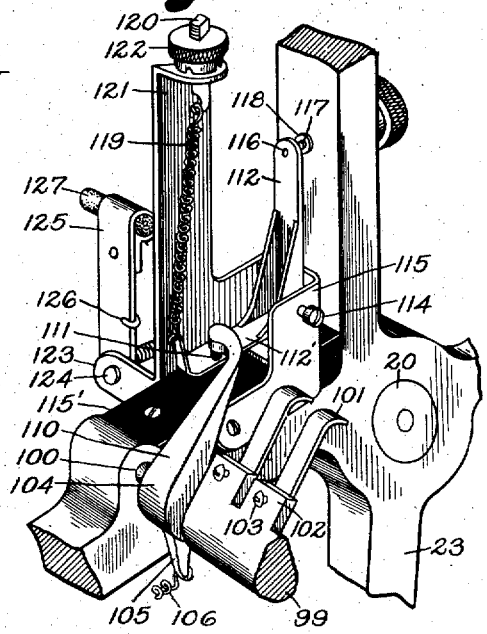
Fig. XLV.
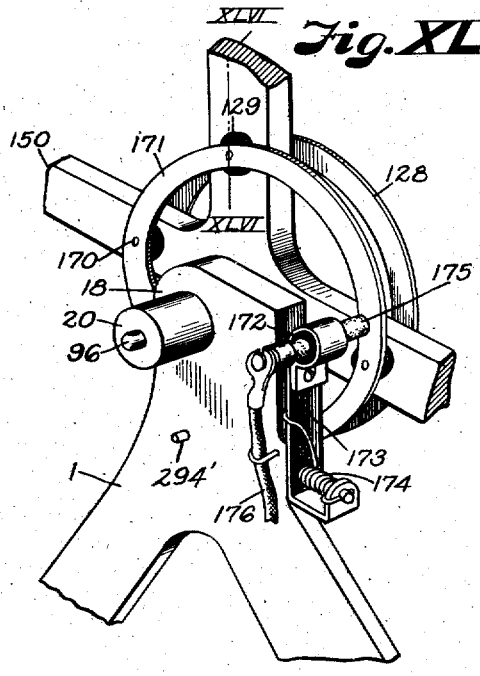
INVENTOR
Edwin H. Piersen
BY Arthur C. Brown
ATTORNEY.

E. H. PIERSEN.
TELEGRAPH TRANSMITTER.
APPLICATION FILED FEB. 9, 1917.
Reissued July 6, 1920.
14,910.
15 SHEETS—SHEET 15.
Fig. XLVII.
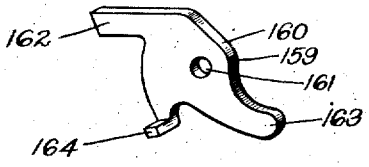
Fig. XLVIII.
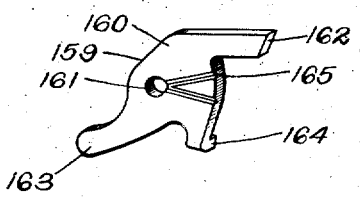
Fig. XLIX.
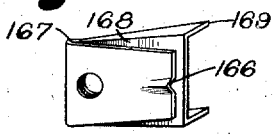
Fig. L.
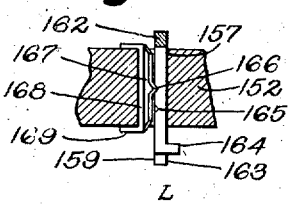
Fig. LI.
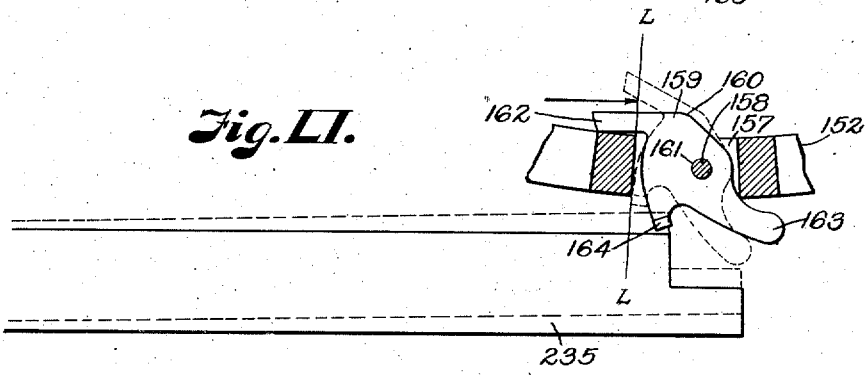
Fig. LII.
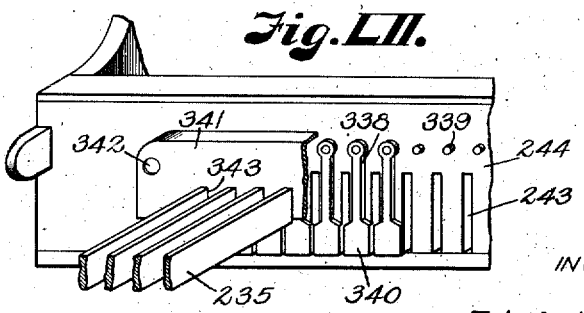
INVENTOR
Edwin H. Piersen
BY Arthur C. Brown
ATTORNEY

UNITED STATES PATENT OFFICE.

EDWIN H. PIERSEN, OF TOPEKA, KANSAS, ASSIGNOR TO THE PIERSEN TELEGRAPH TRANSMITTER COMPANY, OF TOPEKA, KANSAS, A CORPORATION OF KANSAS.

TELEGRAPH-TRANSMITTER.

14,910. Specification of Reissued Letters Patent. Reissued July 6, 1920.

Original No. 1,157,040, dated October 19, 1915, Serial No. 737,239, filed December 17, 1912. Application for reissue filed February 9, 1917. Serial No. 147,709.

*To all whom it may concern:*

Be it known that I, EDWIN H. PIERSEN, a citizen of the United States, residing at Topeka, in the county of Shawnee and State of Kansas, have invented certain new and useful Improvements in Telegraph-Transmitters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to telegraph transmitters, and more particularly to one of that class utilizing a keyboard for releasing character forming members to the action of a motor and into operative relation with a circuit making and breaking mechanism, whereby impulses corresponding to those produced by an ordinary telegraph key are created.

It is the principal object of the present invention to produce a machine of this type wherein devices indicative of telegraphic characters may be accumulated in storage and effect driving connection of character members with a suitable motor in proper sequence to operate a circuit making and breaking device as a key at sending speed irrespective of the speed or regularity of operation of the keyboard, thereby obviating confusion of the symbols or the necessity for special training of an operator. In accomplishing this object, I provide a storage element comprising an accumulating drum or cylinder having a plurality of trip members for each character sendable by the machine, and a single character member for each set of trips. A transmitting element, movable independently of the storage element comprises character members individually mounted in a frame, which is independent of, but adapted for actuation from the drum driving mechanism, the connections being such that rotative tension from said driving mechanism will tend to move the drum and frame in opposite directions, with the result that while the character frame is always advanced with the accumulating drum it always returns to its initial position, and during its return travel wipes the active trips in the drum to release the proper character members.

In the following description, the terms "storage element" and "setting element" include the drum or cylinder with its trips for setting the levers whereby the character members in the transmitting element are positioned for operation, and the term "transmitting element" includes the character members, their frame and positioning levers and, broadly, the circuit making and breaking mechanism, which latter is hereinafter referred to as a "circuit closer" without intention of defining the polarity of the impulses. While the character member levers in the transmitting element are in reality "set" by the dogs in the storage or "setting element," I refer to them as "positioning" devices in order to avoid confusion in terms. For the same reason I refer to the key levers and their connected parts as "selecting" levers or mechanism.

It is also an object of the invention to provide improved details of structure for accomplishing the general object above mentioned, the preferred forms of which are illustrated in the accompanying drawings, wherein:—

Figure I is a side elevation of a telegraph transmitter constructed according to my invention, the case being in section.

Fig. II is an elevation of the opposite side of the same.

Fig. III is a longitudinal section of the same.

Fig. IV is an elevation on the line IV—IV, Fig. I, the case and drum being in vertical section.

Fig. V is a rear perspective view of the frame and keyboard levers.

Fig. VI is a side elevation of the transmitting element.

Fig. VII is a front view of same.

Fig. VIII is an elevation of the opposite side of the device.

Fig. IX is a rear view of the device.

Fig. X is a section on the line X—X, Fig. II, showing the visible, audible and touch indicators and keyboard lock.

Fig. XI is a perspective view of a device for uniformly varying the touch of the keyboard.

Fig. XII is a perspective view of parts of the cylinder escapement and erase pawl.

Fig. XIII is a perspective view of the keyboard indicator finger and carriage.

Fig. XIV is a perspective view of a portion of one of the key levers, illustrating its method of mounting.

Fig. XV is a perspective view of one side of the spacer bar lever showing its mounting and tension rod.

Fig. XVI is an inverted perspective view of the key lever spring adjusting device.

Fig. XVII is a detail view of one of the character members and mounting, a part of the auxiliary mechanism and a portion of the storage drum, the parts being shown in normal position.

Fig. XVIII is a similar view, the parts being shown in operative position.

Fig. XIX is a sectional view of one of the character members and its mounting.

Fig. XX is an enlarged perspective view of a portion of the lower part of the transmitting element, viewed from the inside.

Fig. XXI is a perspective view of the stop lever for controlling the character member.

Fig. XXII is a perspective view of a gear for operating the transmitting element.

Fig. XXIII is a similar view of the opposite side of said gear.

Fig. XXIV is a perspective view of one of the character members.

Fig. XXV is a diagrammatic view of one of the character members showing the relative position of character member and brush when the latch is about to trip.

Fig. XXVI is a similar view of the same parts after the latch has tripped, showing how the character member is automatically brought into proper relation to the brush to correct the spacing between characters.

Fig. XXVII is a perspective view of the word space character member.

Fig. XXVIII is a detail view of the governor and its setting mechanism.

Fig. XXIX is a detail view of a cam for actuating the governor setting mechanism.

Fig. XXX is a sectional view of the indicator on the line XXX—XXX, Fig. XXXI.

Fig. XXXI is a perspective view of the speed indicator.

Fig. XXXII is a detail view of the indicator quadrant.

Fig. XXXIII is a detail view of the indicator spring.

Fig. XXXIV is a perspective view of one of the indicator sheaves and the device for locating the home position of the transmitting element.

Fig. XXXV is a sectional view of a spring latch for securing the cover to the frame.

Fig. XXXVI is a perspective view of a hand key used in connection with the machine.

Fig. XXXVII is a detail perspective of the key lock.

Fig. XXXVIII is a vertical section of the key and its mounting, on the line XXXVIII—XXXVIII, Fig. XXXIX.

Fig. XXXIX is a side elevation of a front part of the machine case, showing the mounting of the hand key.

Fig. XL is a perspective view of the crank cup and pawl for winding the spring motor.

Fig. XLI is a vertical section on the line XLI—XLI, Fig. XLII.

Fig. XLII is a sectional view through the casing, showing the ratchet crank and winding pinion.

Fig. XLIII is an outside perspective view of the circuit closer.

Fig. XLIV is an inside perspective view of same.

Fig. XLV is a perspective view of the collector rings and the frame wiper, forming part of the circuit closer.

Fig. XLVI is a section on the line XLVI—XLVI, Fig. XLV, showing the insulation for the collector rings.

Fig. XLVII is a detail perspective view of one of the dogs in the storage drum.

Fig. XLVIII is a similar view of the opposite side of same.

Fig. XLIX is a detail perspective view of the spring latch for the above named dog.

Fig. L is a sectional view on the line L—L, showing the relation between the spring latch and dog.

Fig. LI is a side elevation of one of the dogs and its key lever, illustrating the action of those parts.

Fig. LII is a perspective view of the latch board for insuring single actuation of the key levers.

Referring more in detail to the parts:

1 designates a frame wherein the storage drum, transmitting element, keyboard, and other operative parts of the machine, are mounted, being preferably provided with rubber feet 2 for cushioning its support and deadening the sound of the machine, and with rearwardly extending lugs 3 to which the ears 4 of a cover 5 are pivotally mounted. The cover 5 covers the frame 1 and the parts contained therein, and has forwardly extending side portions 6 adapted for inclosing the keyboard, the inclined top being preferably provided with a copy holder 7. The rear of the cover is provided with suitable apertures for receiving the binding posts 8—9, the former of which is grounded on the case and the latter insulated therefrom in order to complete a grounded circuit through the parts of the machine, as will presently be described.

In order to hold the cover in place, I provide same with latches 10 (Figs. IV and XXV) comprising a cup 11 which is threaded into the cover from the inside and has an aperture 12 through which a plunger 13 is slidably projected, the inner end of the plunger being adapted to seat within a socket 14 in the stationary frame 1 and normally held in its holding position by a coil spring 15 which bears against the base of the cup 11 and against a shoulder 16 on the plunger, the outer end of the plunger being provided with a knob 17 by which it may be drawn outwardly against the tension of the spring to break the connection with the frame when the cover is to be tipped back.

*Transmitting element.*

Journaled in hubs 18 and 19 (Fig. IV), on frame 1, are tubular gudgeons 20 and 21, which project axially from the transmitting element frame 22 (Figs. VI and IX) comprising skeleton end members 23 and 24 on which the gudgeons are fixed and tie rods 25 and 26 and bars 27 and 28 which unite the end members to form a rigid frame. The bar 27 is seated within offsets in the rear of the end members 23 and 24 and provided with slots 29.

Pivotally mounted on a shaft 30, which is fixed in the end members 23 and 24, and extending through the lower portion of the bar 27, are bell crank levers 31 corresponding in number with the transmitting element comprised by the machine.

The upper arm of each bell crank lever extends upwardly and forwardly past the center of the storage drum within which the transmitting element is mounted and near its end is offset and provided with a lamina 31′ (Fig. XIX) which is spread from the body of the lever to form a pocket for containing the character member 32, presently described, and at its end is a downwardly facing shoulder 33 and upwardly facing hook 34. The lower arm of the lever is pointed and slidably mounted in slots 35 (Fig. XX) in the plate 36 of a slide 37, the ends of which project through apertures in the end members 23 and 24.

*Character member.*

Each character member 32 is revolubly mounted within the pocket in its bell crank lever by means of a pin 38, and comprises a gear wheel 39 (Fig. XXIV) the teeth of which are preferably pointed in order to fit readily into a driving pinion by which it is actuated.

On the side of the gear wheel is a symbol ring 40 having teeth 41 on its periphery, of such form and sequence as to represent the symbol of a telegraph code which that particular member is adapted to send, it being understood that each of the character members is adapted, by being provided with teeth 41 of different form and sequence, to send an individual character. The teeth 41 terminate within the circumference of gear wheel 39 in order to clear the clash gear presently described and otherwise be protected thereby, and preferably have straight, radial, rear faces, and inclined forward faces upon which the brush teeth may ride to provide smooth and easy action.

Each symbol ring 40 is provided with a plurality of sets of teeth 41, the number of sets being determined by the space required for the various dot and dash teeth. The inner periphery of the ring has a point 42 for each set of character teeth, arranged to stop or set the character member in proper relation to its releasing device, and the gear wheel 39 has a plate 43 fixed on its face within the ring 40 and provided with notches 44 corresponding in number and arrangement with the points 42, and adapted for coöperation with said points to set the character member.

The bar 28 at the front of the frame 22 is arranged beneath ears 45 on the frame 22 and provided with slots 46.

Pivotally mounted on a shaft, 47, carried by the ears 45, and the bar 28, are the latch levers 49 which correspond in number and arrangement with each of the bell crank levers and character members. Each lever 49 has an arm 50 yieldingly held against the shoulder 33 of the bell crank lever 31 by a spring 51 the one end of which is carried by the hook 34 on the end of the bell crank 31 and the other by a hook 52 at the point of the lever 49; the second arm 53 of the latch lever being projected past the side of the character member and provided with an inturned lip 54 (Fig. XXI) adapted for engagement with the points 42 and the notched plate 43 on the face of the gear wheel forming part of the character member.

The notches 44 in the plate 43 have straight faces 44″ and inclined faces 44′ which are located relative to the point 42 and arm 53 so that as the character member is revolved, (it being assumed that the character is running through as shown in Fig. XVIII) the point 42 will move against the end 54 of arm 53 and trip the arm 50 and release the character member from its driving mechanism. As the end 54 is moved into the notch 44 of the plate 43 by the releasing action, it first contacts the inclined surface 44′ thereof and turns the character member until the end 54 ultimately rests against straight face 44″ of the notch 44. The object of this mechanism is to correct and equalize the spacing between characters because, owing to the fact that it is impossible to divide the characters of a telegraph code equally on the peripheries of disks or rings of the same diameter I prefer to form each character in its proper length and allow the resulting variation to enter in the spaces between the characters on the disk or ring, so that it can be mechanically corrected as described. It is apparent that the relative positions of the point 42, arm 53 and notch 44 are such that the distance of the point at which the end 54 contacts with the inclined surface 44′ immediately after being tripped by point 42, from the point at which the end 54 finally rests against the straight face 44″ is equal to the amount of correction necessary to move the character member sufficient to produce equally spaced characters.

As the contacting area of the latch and bell crank levers is small, I provide a guide for holding both parts in position, comprising a plate 56 at the front of the frame having a slot 57 for each pair of levers and within which said levers may operate freely but in proper relation.

*Clash gear.*

Revolubly mounted in and extending between the end members 23 and 24 at the top of the frame 22 is a shaft 58 having a gear wheel 59 rigidly fixed to one of its ends and meshing with a gear wheel 60 revolubly mounted on a stub shaft 61 on the end member 24.

Revolubly mounted on shaft 58 is a sleeve 62, the ends of which carry bell crank hangers 63, the lower arms of which project over and adjacent to the plane of the character members and carry an elongated revoluble pinion 64; the upper ends of the hangers being adapted for abutment against the tie rod 25 to hold the pinion out of engagement with the gear wheels of the various character members when the latter are in idle position, a spring 65 being connected with the lower end of one of the levers and with the end member 24 in order to yieldingly tension the pinion toward the character members and retain the upper ends of the hangers against the tie rod to insure proper meshing of the character member gear teeth with the pinion.

*Sending speed governor.*

Rigidly connected with the pinion 64 is a gear wheel 66 which meshes with a gear wheel 67 on the shaft 58, the gear wheel 67 in turn meshing with a small gear wheel 70 rigid on the large gear wheel 71 which is revolubly mounted in point bearings 72 and 73 carried by the end member 24, and an arm 74 depending from the tie rod 25 respectively. The gear wheel 71 meshes with a pinion 75 forming part of the governor shaft 79 (Fig. XXVIII), which is revolubly mounted in point bearings 71′—77, on the end member 24, and an arm 78 also depending from the tie rod 25, so that all of the gearing carried by the transmitting element frame is controllable by a governor which is mounted on the governor shaft 79.

The governor which I show, and prefer to use comprises wings 80 which are rigidly secured on the shaft 79 and to which the weights 81 are pivotally connected, the weights in turn being yieldingly held in collapsed relation by springs 82, and provided with rollers 83 which are adapted to bear against a disk 84 that is slidably mounted on shaft 79, when the governor weights are expanded to move the disk along said shaft.

Slidably mounted in arm 78, and in an arm 85, also depending from the tie rod 25, is a rod 86 having a leather, or like friction inducing tip 87 adapted for contact by the disk 84 and provided with a spring 88 which bears against the arm 85 and against a collar 89 on said rod to yieldingly tension same toward the governor disk, the spring being sufficiently strong to hold the governor against the tension of the spring motor by which the device is actuated, and lock the machine.

To release the governor, I provide a lever 90, which is pivotally mounted on the end member 23 by a pin 95, one arm of the lever having a yoke 91 straddling the rod 86 and adapted to bear against a collar 92 slidably mounted on said rod and bearing against a cushioning spring 93 which surrounds the rod and bears against a fixed head 94 on the outer end thereof, the lower end of said lever being extended past the inner end of the gudgeon 20 and adapted for engagement by a pin 96 which is slidably mounted therein. The end of the pin terminates adjacent the cover 5 and is adapted for engagement by a setting cam operable from the exterior of the machine whereby the space between the end of the stop rod 86 and the governor disk may be regulated to determine the speed at which the characters may be sent, as will presently be more fully described; it being apparent, however, that by extending the pin 96 through the gudgeon, on which both the transmitting element frame and storage drum are mounted, the governor contained within and at one side of the center of the cylinder may be controlled by the apparatus on the exterior of the casing, so that it is unnecessary to uncover the working parts, or have access to the character mechanism, in order to secure such regulation.

*Circuit closer.*

In order to limit the speed of the governor, I also provide the end of the transmitting element frame with a set screw 98, the end of which is adapted for engagement by the head of the rod 86 when the latter is moved outwardly, to limit the space between the end of the rod and the governor disk and thereby limit the speed of the machine, it being apparent that the screw will positively stop the travel of the rod when engaged thereby, and that should an operator endeavor to increase the speed by manipulation of the first mentioned regulator, the upper arm of the lever 90 will simply compress the spring 93 on rod 86 without shifting the rod past the point fixed by the set screw.

The circuit closer which I prefer to use comprises a brush bar 99 (Figs. XLIII, XLIV and XLV) which is pivotally mounted in point bearings 100 in the end members 23 and 24 and has a longitudinal groove within which the split brush 101 is mounted, the brush comprising flexible leaves, each having a down-turned free end adapted for engagement with the teeth on one of the character numbers; the bar having a lip 102 for each brush leaf, through which a set screw 103 is projected to contact the leaf and adjust the same to secure the proper cooperation with the character member.

Fixed to one end of bar 99 is a lever 104 having a lower arm 105 provided with a spring 106, the rear end of which is connected with the hook 107 (Fig. VIII) on the inner end of a pin 108 which extends through the cross bar 27 and has a thumb nut 109 threaded thereon to adjust the tension of the spring and control the "touch" of the circuit closer.

The upper arm 110 of lever 104 has a laterally turned tip provided with a depending boss 111, of rubber, or other insulating material, which overlies the horizontal arm 112′ of a rocker 112, which is pivotally mounted between point bearings 114 that project through the sides of a U-shaped bracket 115 which is rigidly mounted on an insulating base 115′ on the transmitting element frame, so that the bracket and the bars connected therewith are insulated from the frame, the upper end of the rocker having a point 116 adapted for contact with a point 117 on a screw 118 which is carried by a web of the end member 23, the horizontal member of the rocker being provided with a spring 119 which is hung from a screw 120 on an upstanding arm 121 of the U-bracket 115 and is adjustable by a thumb nut 122 to vary the tension of the rocker toward its contact member.

Extending laterally from the U-bracket 115 are ears 123 which carry a pin 124, and pivotally mounted on said pin is an arm 125 which is yieldingly tensioned outwardly by a spring 126 and carries a brush 127 which is adapted to wipe the inner ring 128 of a current collector which is fixed to fiber or like insulating washers 129 carried by the spider webs of the storage drum, and will presently be more fully described.

It is apparent that when the character members are released and actuated by the elongated pinion 64 to rock the brush bar, the lever 104 will rise and fall from the rocker 112, making and breaking contact between the rocker and the point 117 on the transmitting element frame, so that with a circuit wire grounded on the frame an electric circuit is closed and opened therethrough, through the rocker bracket and brush to the collector ring, as the rocker contacts and separates from the point, the insulated mounting for the bracket preventing grounding of the other circuit wire which leads to the collector ring 128.

*Character runout—elimination—repeat.*

The storage drum, within which the transmitting element frame is contained, has setting devices pivotally mounted in its circumference and adapted for projection into the interior, as will presently be described in detail. Each of the setting devices, however, is adapted, when rocked into active position, for engaging the lower end of the bell crank lever which carries its particular character member so that the latch 49 will catch the upper end of the lever and hold same until the character has been completed. In order to positively lock the bell crank lever and setting devices together until the character has been completed, I provide a latch mechanism comprising a latch bar 130 which extends entirely across the transmitting element frame and is pivotally mounted on a rod 131 carried by bearings 132 that project rearwardly from the slide 37, the latch bar 130 having upwardly directed ears 133 provided with a concaved front face (Fig. XX), and being provided with a depending web 134 having slots 135; the tongues of the plate being in front of the slotted portions of the slide 37, so that under ordinary conditions the lower ends of the bell crank levers will lie directly back of the tongues.

Pivotally mounted on the end members 23 and 24 of the transmitting element frame are hangers 136 which are connected by a cross member 137 that is adapted to overlie the lower ends of all of the bell crank levers 31, each of the hangers having an inturned stud 138 lying back of the adjacent ear 133 of the cross bar 130 so that when the hangers 136 are tipped upwardly by the engagement of any of the bell crank levers 31 with the cross member 137, the studs will engage the rear edges of said ears and tip the cross bar 130 downwardly so that the proper tongues thereon will engage the trip on the storage drum which has rocked the bell crank lever through which the hangers were lifted.

The cross bar 130 is normally, yieldingly held in elevated position by a spring 130′ which is connected with the bar and with a pin 139 on the end member 23, so that the locking action just described is against the tension of the spring and will be overcome, to return the parts to initial position, as soon as the positive pressure on the cross member is removed.

The object in having the guide member 37 slidable in the frame is to provide for shifting the trip ends of the bell crank levers out of the path of the setting devices so that the drum may be moved backwardly when it is desired to eliminate a message or to repeat all or part of a message; it being apparent that if the setting devices in the drum were left in their active position, and the transmitting element frame returned to the position from which it started to contact the trips, and were again moved forwardly, that the character members, theretofore actuated, would repeat in the same order. In order to accomplish this result, I provide the slotted plate 134, the tongues of which are adapted to engage the bell lever trips (when the plate is tipped) the mounting of the bell crank levers being sufficiently loose to allow the levers to shift when the slide is moved laterally, so that they will avoid the active setting devices. Inasmuch, however, as it is seldom necessary to repeat a message, I provide for normally retaining the slide in position by providing same with a spring 140 which is connected with the body of the slide 37 and with a pin 141 on the end member 24 the adjacent end of the slide having a boss 142 adapted for engaging the inner face of the end member to limit the outward movement thereof under tension of the spring and retain the slotted parts in position for performing their functions.

To move the slide against the tension of its spring, I provide a lever 143 which is pivotally mounted at 144 on end member 24 (Figs. XXII and VII) and between ears 145′ on a disk 145, which is revolubly mounted in a collar 146 on the gear wheel 147 carried by a sleeve 148 on the gudgeon 21; said sleeve being held to the gear wheel by the collar 146, so that it is adapted to move laterally when the gear wheel is moved, as will presently be more fully described, and the lever having a lip 143′ lying along the end of the slide 37 to engage the slide and move it longitudinally upon movement of the sleeve 148 along the gudgeon.

*Storage element.*

The storage drum, within which the transmitting element frame is mounted, comprises spiders 150 and 151, which are revolubly mounted on the gudgeon 20 and the sleeve 148 on the gudgeon 21, and carry the drum 152, which is preferably formed in two parts, so that it may be separated to afford access to its interior, and has a tongue and groove joint 153 (Fig. II). A ratchet 155 (Figs. IV and XII) which extends continuously around the drum at one end, is adapted for engagement by an escapement 156 (Figs. I and V) whereby tension from the motor, tending to revolve the drum is controlled through the key levers, presently described.

The drum 152 contains a circumferential series of slots 157 (Fig. LI) for each character which the machine is adapted to send, the slots in the different series being arranged in transverse alinement and each slot containing a pin 158 upon which a trip setting dog 159 is pivotally mounted, the slots and setting dogs in the various series being arranged in alinement with the normal positions of the bell crank character levers and latch tongues in order to properly coöperate therewith, and so that a single pin may extend through all of the slots in a transverse row.

Each of the setting dogs comprises a body portion 160 (Figs. XLVII–LI) having an aperture 161 just back of its center of mass, an upwardly and forwardly projecting finger 162 which is adapted for engaging and rocking a character lever, a laterally turned ear 164 which acts as a stop to limit the setting travel of the dog and is adapted for engagement by the rear end of the proper key lever to rock the dog to its setting position, and a backwardly and downwardly projecing finger 163 which is adapted for engagement by a wiper to restore the dog to initial position. One face of the dog has grooves 165 diverging from the pivot aperture and adapted for receiving the nose 166 of a spring 167, which is also mounted on the pin 158 within the drum slot, and has a leaf 168 provided with ears 169 which overlie the inner and outer faces of the drum to hold the spring rigidly in position.

Fixed to the non-conductive washers 129 on the webs of the drum spider 150, by pins 170, is an outer current collecting ring 171 (Figs. XLV and XLVI), and mounted in a non-conductive bushing 172, on a bracket 173, which is pivotally mounted on the main frame 1, and yielding tensioned inwardly by a spring 174 is a brush 175 which is connected with the insulated binding post 9 by a wire 176.

*Repeat.*

On the opposite end of the sleeve 148 which carries the gear wheel 147 and disk 145, whereby the repeat slide lever is actuated, is a gear wheel 177 which meshes with a gear wheel 178 on a pin 179 slidably mounted in a bearing 180 in cover 5 and provided with a knob 181 at its outer end, the gear wheel 178 having flanges 182 on its opposite faces projecting over the faces of the gear wheel 177 to engage the sides of the gear wheel 177 without interfering with its revoluble movement, so that upon longitudinal movement of the pin 179 the gear wheel 177, and parts directly connected therewith, will be moved laterally relative to the machine without breaking the connection of the gear wheel 177 with the gear wheel 178.

It is apparent that when the parts are moved laterally, as described, the lever 143 will be rocked to move the slide 37 against the tension of its spring, so that the tongues on the slide member will move the bell lever trips out of line with the setting dogs on the storage drum. So with the parts in this position rotation of the knob will rotate the transmitting element frame, so that the latter may be moved back to a starting position without changing the position of the storage drum, and so that when the driving connection with the transmitting element frame is reëstablished, the contacts of the bell crank levers with the setting dogs will be repeated, and the character members again operated to repeat a message.

*Rotative tension.*

One-half of the lateral surface of gear wheel 147 meshes with the gear 60, which is the first in train leading to the governor and to the pinion 64, and the other half meshes with an intermediate gear 183 (Figs. I and IV), which is revolubly mounted on a stub shaft 184 on the spider 151. The gear wheel 183 meshes with the gear wheel 185 rigidly mounted on a shaft 186 revoluble in one of the arms of the spider, the opposite end of said shaft having a gear wheel 187 fixed thereto and meshing with one-half the lateral surface of a large gear wheel 188 revolubly mounted on a collar 189 on the bearing 19 of the main frame 1. The other half of the lateral surface of gear 188 meshes with an intermediate gear 193, on a stub shaft 194, on the main frame which in turn meshes with a large gear wheel 192, revolubly mounted on the stub shaft 195, also carried by the main frame and provided with a small gear wheel 196 which is engaged by a large gear wheel 197 on a motor 198 which may be of any suitable construction, but is preferably carried by bearings 199 on the main frame.

The motor (which is preferably of a spring type) has a gear wheel 200 at the end opposite the wheel 197 (Fig. II), which meshes with a gear 201 on a shaft 202 (Fig. XLII) which is revolubly mounted in a bearing 203 on the case 5.

Fixed on the projecting end of shaft 202 is a ratchet wheel 204, and revolubly mounted on said shaft is a crank 205 having a case 206 inclosing the ratchet wheel and adapted for revoluble movement in a groove 207 in the end of the bearing; the case and crank being held to the shaft by a nut 208.

In the head of the crank arm is a pocket 209, and pivotally mounted in said pocket is a pawl 210, which is yieldingly held in engagement with the ratchet wheel 204 by a spring 211, so that the crank is operative in but one direction.

It is apparent, therefore, that when the motor is wound up by the crank, it will tend to revolve the gear wheels 197, 196, 192 193 and 188, the latter being the last in train from the motor to the storage drum, and that tension from the wheel 188 is transferred to the wheel 187, thereby exerting a rotative force on the drum in the direction of the arrow (Fig. I by virtue of a resistance offered the gear 187), and that simultaneously with this rotative tension, power is transferred through the gear wheel 187 on the shaft 186, and wheels 185, 183 and 147, to the gear wheel 60, on the transmitting element frame 22, through wheels 59, 67 and 66 to the elongated pinion 64 and through the wheel 70, which meshes with the wheel 67 and wheels 71 and 75 to revolve the governor.

*Repeat lock.*

The gear wheel 60 is heretofore described as the last in train from the governor and is controlled thereby, so that all of the transmitting element, the gear 183, and transmission to and including the gear 187, is locked by the governor, when the latter is in locking position. It is apparent, however, that as the transmitting element and the storage drum are both revolubly mounted on the gudgeons, tension from the motor will tend to revolve the drum in the direction of the arrow (Fig. I), and that when the transmitting element is rigidly connected with the drum, all of the parts may be revolved backwardly as indicated, irrespective of the locking or unlocking of the governor. It is also apparent that if, when the gear wheel 147 is moved laterally to shift the repeat mechanism, it should entirely leave its contact with the gear wheel 60, with which half of its surface normally meshes, the connection with the governor would be broken and the motor would be free to race. In order to obviate such action, I provide the outer face of the gear wheel 147 with a clutch face 212, which is adapted to mesh with a similar face 213 in the adjacent spider 151 when the repeat mechanism is shifted, and thereby lock the motor with the drum until the repeat mechanism is returned to its original position, the gear teeth on the gear wheels being preferably beveled to facilitate their meshing when the gear 147 is returned to active position.

It is apparent that when the gear wheel 147 is shifted out of mesh with the gear wheel 60 the transmitting element frame may be revolved without actuating the governor and the intermediate gearing, thereby relieving the operation of the tension required for operating such mechanism, and also making it possible to revolve the frame while the governor is locked.

*Speed indicator and regulator.*

I also provide the machine with means for indicating and regulating the speed of the governor, the preferred form of such mechanism comprising a cam 220 (Figs. XXIX and XXX) which is rigidly mounted on a shaft 221 revoluble in the case 5 in such position that the face of the cam may engage the outer end of the rod 96 (Fig. XXVIII).

Pivotally mounted on shaft 221, on the outside of the case is a stop member 222 having a finger grip 223 at one end and a pawl 224 and a stop 225 at the opposite end adapted for coöperation with a dial, presently described.

Rigidly fixed on shaft 221 is a pointer 226 which is adapted for movement over the dial, and a knob 227 by which the shaft, and the cam and pointer which are rigidly mounted thereon are actuated.

The dial, above mentioned, comprises a curved plate 228 which is set out from the side of the case, so that the stop pawl may project therebetween and has an inturned flange provided with notches 229 within which the pawl is adapted to seat to yieldingly hold same in a set position.

It is apparent that with this construction the stop member may be set for any desired speed of the governor and that when the pointer 226 is turned it will engage the stop lip 225 so that the cam is held in position for securing a desired speed of the governor, but that the stop member may be moved forwardly to secure a higher speed by forcing the pointer against the stop lip or by moving the stop member through the finger piece 223. The stop may be set back by means of the finger lip to again set the governor for a lower speed.

*Keyboard.*

The keyboard which I prefer to use with the machine comprises levers 235 (Figs. V and XII), each of which has a slot 236 straddling a rod 237 which is mounted in a standard bracket 238 on the base of the frame 1 and projects through slots 239 in the standard bracket into which each of the key levers is projected. The rear end of each of the character member releasing key levers is projected through a similar slotted standard bracket 240 to the rear of the brackets 238 and terminates in such position that the rear edge of each underlies the laterally turned ears 164 in one series of setting dogs 160 (Fig. LI), the end of each key lever having a downcut, rearwardly projecting portion extended beneath the rib 241 of the universal escapement and correcting shaft 242 on which the escapement 156 is rigidly fixed, the forward ends of all of the key levers being extended through slots 243 in a front plate 244 mounted on the forward end of frame 1.

In the base of frame 1, immediaely back of the standard bracket 238, are apertures 245, and projecting through said apertures are springs 246, the upper end of each of which is connected with a pin 247 on one of the key levers and the lower end of which is connected with a loop 248 (Fig. XVI) on an adjusting bar 249 which is located below the base of the frame and has an upturned lip 250 on its forward end projected into a cross groove 251 in the base, the rear end of said member having an offset lip 252 provided with a set screw 253 which is adapted for abutment against the base of the frame and whereby the tension of the spring may be regulated to adjust the touch of the key lever controlled by that particular adjustment.

At each side of the bank of active key levers 235 are levers 254—255, similar in construction and mounting to those already described which extend to the front of the keyboard and carry a space bar 256, the lever 254 preferably extending but a short distance rearwardly of the bracket 238, and the lever 255 being adapted for releasing a blank character member 255′ (Fig. XXVII) so that the machine may be operated idly to produce the required spacing between words or characters.

The bars 254 and 255 are preferably connected by a torsion rod 258 to provide a desirable rigid connection within the frame.

*Universal escapement.*

The universal escapement and erase or correcting device preferably comprises the shaft 242 which is pivotally mounted in point bearings 260 at the sides of the frame 1, rib 241 being integral therewith and projected radially therefrom, the upper surface of the rib merging into the shaft on an easy curve in order to afford space for pivotal movement of the drum setting dogs, and to provide for returning the setting dogs when the drum is back-spaced, during the erase operation, the lip 241 being normally, yieldingly tensioned downwardly against the offset ends of the key levers by a spring 262 which is connected with a hook 261 on the shaft 242 and with a hook bolt 263 which is slidably mounted in a bracket 264 on the frame 1, and has a thumb nut 265 whereby the spring tension may be adjusted to regulate the touch of the key levers.

The escapement pawl 156, heretofore mentioned, is rigidly fixed on the shaft 242 in position for engaging the ratchet on the drum, so that whenever the escapement shaft is rocked by one of the key levers the pawl is actuated to release the drum for one step under the influence of the motor.

*Keyboard lock—storage indicator.*

Also pivotally mounted on the rod 237 are levers 270, the forward ends of which are turned upwardly within the front of the frame and provided with a connecting bar 271 which extends across the bank of key levers and has a horizontal, cushioned flange 272 at its lower edge, the upper edge of the bar having a raised track 273 over its central portion provided with inclined approaches 274, and having a hook 275 near its right-hand end. Each of said levers is provided with a spring 246 similar to that provided for each of the other key levers, whereby the bar levers are yieldingly tensioned upwardly and each of said bar levers is connected with a stop bar 277 which extends beneath the active key levers, and is adapted for engagement by said key levers when the tram 280 (presently described) is at either end of the track 273, to increase the tension required for lowering the key levers, and also to lock the machine under conditions hereafter described.

Projecting inwardly from the upper edge of plate 244 is a flange 278 having a rail 279 depending over the track 273. Located between the track 273 and rail 279 is a tram 280 comprising a frame 281 (Figs. V, X and XIII), having flanged wheels 282 adapted for travel along the depending rail 279, and a single flanged wheel 283 adapted for travel along the upper edge of bar 271 and over the raised track 273.

A finger 285 projects from the forward face of the tram frame, through a slot 286 in plate 244 and over a dial plate 287 bearing suitable characters to indicate by the position of the tram, as will presently be shown, the number of character members which have not yet completed their function of sending a symbol.

A wire cable, or the like, 288 (Fig. IV) is secured to each end of the tram frame 281 and run through an aperture 289 in the sides of the main frame and over sheave wheels 290 on the outside brackets 291 to the drum 292 on gudgeon 21 and 292′ on gudgeon 20 respectively; the cable being extended above one drum and below the other and wound thereon so that as the gudgeons revolve one of the cables may be paid out and the other taken up to move the tram transversely along its track.

Each of the drums 292—292′ has an ear 294 (Fig. XXXIV) thereon adapted for engagement with a pin 294′ on the main frame whereby the transmitting element frame may be held in initial position and stopped in such position after each period of travel.

Pivotally mounted on and depending from the track 279 is a hook 293 which normally clears the hook 275 on the track 271, but is adapted for movement into engagement therewith when moved from behind by the tram frame when the latter has passed over the inclined track way 273, and thereby lock the levers 270 in their elevated position, so that the stop bar 277 will hold the key levers and prevent their movement to release setting dogs on the storage drum.

On the rear face of the tram frame 281 is a bracket 295 having a roller 296 revolubly mounted thereon and adapted for engagement with the arms 299 on the rod 298 which is revolubly mounted in bearings 297 on the flange 278 for the purpose of rocking said rod to raise the clapper 300 so that it may fall against a bell 301 and thereby indicate to the operator that the machine is reaching its storage limit or is nearing its initial position.

*Erase.*

I provide for back-spacing the storage drum, to correct an error or erase an entire message, through the medium of a key lever 303 which is pivotally mounted on the rod 237, as are the other key levers, and has a touch button 304 somewhat larger than those on the other keys to distinguish it therefrom. The lever 303 is arched downwardly through a slot 305 in the base of the frame 1 in order that it may pass beneath the shaft 259, and has a pawl 306 pivotally mounted on its rear end, the loose end of the pawl being adapted for engagement with the ratchet 155 on the drum, so that when the key lever is actuated the pawl will push against the drum and move same backwardly one space against the tension of the motor, said pawl being provided with a stop flange 307 which is adapted for engagement with the top edge of the lever, and with a spring 307′ which allows the pawl to yield when drawn backwardly over the ratchet, it being apparent that the wiper will reseat the setting dogs when the drum is revolved in a reverse direction.

*Hand key.*

I also provide the machine with a hand key for use in case of an emergency, or preference, and which is provided with a switch whereby it may be thrown into or out of operative relation to its contact point, the structure which I prefer to use comprising a sleeve 308 (Figs. XXXVI-XXXIX-XXXVIII) having a slotted head 309 and a downwardly facing shoulder 310, at its upper portion and slots 311 near its lower end, the head and shoulder being adapted to overlie a boss 312 on the casing 6 and the entire device being held within the boss by a nut 313 on the lower end of the sleeve.

Slidably mounted within the sleeve is a key pin 314 having a button 315 on its upper end and having a wedge-shaped lift block 316 fixed thereto above the head of the sleeve, a pin 317 being fixed thereto and adapted for travel within the slot in the sleeve 308 to limit the vertical movement of the pin. The key pin projects through an aperture 321 in a flat spring 320 which is secured to a boss 319 on the case 6 and has a shoulder 318 adapted to bear against the top of said spring and whereby the key pin is yieldingly retained in its elevated position.

Immediately beneath the lower end of key 314 is a contact point 322 which is carried by a bracket 323 on a boss 325 on the frame 6 and provided with a lock nut 324 for insuring its constant position in the bracket, the point 322 being connected with the binding post 9 by a wire 326.

Surrounding the sleeve 308 and bearing against the top of the boss 312 and the shoulder 310 is a washer 327 which serves as a bearing for a collar 328 which surrounds the sleeve and has upturned dogs 329—329′ at its opposite edges, the dog 329 being projected through the slot 309′ in the head 309 on the sleeve 308 to hold the collar 328 to the sleeve, the dog 329 being struck up from the collar 328 and the dog 329′ being integral with a spring leaf 330 formed by slitting the body of the collar. Surrounding the sleeve, between the collar 328 and the head 309, is a hub 331, having peripheral notches 332 for receiving the spring dog 329′, and having a recess 333 for receiving the integral dog 329, said hub being also provided with a hook arm 334 adapted for overlying the wedge-shaped block 316 on the key pin, and a handle 335 having a lever 336. With this construction, when the lever 336 is moved to one limit of its travel the key pin is free to rise and is yieldingly raised by the spring 320, so that it may be operated in the ordinary manner.

When, however, the line is to be closed through the instrument, the lever is moved to its opposite limit moving the hook arm 334 over the wedge block on the pin and holding the pin in contact with the point 322.

It is apparent that when the integral dog 329 is engaged by the handle 335, or by the opposite end of the recess 333, the hub will be stopped, and that the spring dog 329′ will yieldingly engage the notches 332 to hold the hub against accidental movement.

*Single key lock.*

In order to prevent the actuation of more than one of the key levers at a time, I provide the front plate 244 with tumblers 338, each of which has a shank located between adjacent slots 243 in the plate and has a head pivotally mounted on a pin 339 projecting from the front face of said plate. Each of the tumblers has a block 340 at its lower end of such width that when one of the key levers is depressed and passes between the blocks of adjacent tumblers, all of the tumblers in the set are moved laterally and the spaces closed, so that should a second lever be moved downwardly it will engage the tops of the adjacent tumbler blocks and be held against complete downward movement.

A hood 341 incloses the tumblers to prevent interference with their operation, said hood being secured to the front plate by screws 342 and provided with slots 343 through which the key levers may project.

*Operation.*

In using the apparatus, presuming the parts to be constructed and assembled as described, the proper connections made with a line wire and the motor active and held by the governor control latch 227, a message is sent, as follows: The operator first releases the governor by turning the knob 27 to release the governor disk from tension of the rod 86 so that the elongated pinion 64 is revolved constantly to drive whatever character member gear wheel may be thrown into mesh therewith, the release of the governor, however, having no effect on the storage drum, as the latter is held by its escapement pawl. When the first letter of the message is struck the rear end of the key lever for that letter engages the laterally turned ear 164 of one of the setting dogs 159 in the storage drum in the series for the particular character represented by the key lever and rocks said dog so that its contact portion projects inwardly into the drum, at the same moment actuating the escapement 156 so that the motor is allowed to move the drum one space. As soon as the drum is moved one space, rotative tension on the transmitting element frame, which is revolubly mounted within the drum, but tensioned backwardly relative to the movement of the drum, throws the frame back toward its initial position, so that the point of the bell crank lever 31 engaging the raised inner portion of the setting dog 159 causes the lever to rock upwardly, thereby moving all of the parts in that set to the position shown in Fig. XVIII, that is the lifting of the lower arm of the lever causes the arm to engage the cross rod 137, lifting said rod so that the studs 138 on the hangers 136 rock against the ends of the cross member 130 and move the latter downwardly into engagement with the setting dog 159 to hold the latter and prevent the release of the bell crank lever or further motion of the drum relative to the transmitting element frame until the character represented by that particular lever has been sent. Simultaneously with the action carried through at the lower end of the bell crank lever, the upper end of the lever is also lifted so that the gear wheel on the character member carried by said bell crank lever is moved into engagement with the constantly revolving pinion 64, and immediately begins to revolve under the influence of said pinion, the lifting of the upper end of the bell crank lever freeing the latch 49, so that its arm 50 is moved below the edge of the offset portion 33 to hold the lever up, and its arm 53 is moved outwardly into the path of the inturned teeth 42 on the cam face of the character member. While the parts are in this position, the character teeth 40 are engaged by the brush 101, the rise and fall of the brush making and breaking a circuit through the circuit closer, as is readily apparent from the drawings and from the description of such part heretofore given.

Owing to the fact that there is an inturned tooth 42 for each set of character teeth on the disk 40, when the character has been sent, the tooth 42 engages the arm 53 of the latch 49 and moves same outwardly until the arm 50 may move over the end of the offset portion of the bell crank lever, the arm 53 then moving toward the center of the character member and engaging the notched portion 44 to hold the character member in set position, the notches 44 having inclined faces 44′ against which the teeth 54 are adapted to impinge to turn the character members as the latter are lowered with the bell crank lever, so that the member is always turned to a set position as it comes to rest, the length of the inclined face determining the travel of the member under influence of the tooth. It is apparent that with this mechanism any error in arrangement of the sets of character member teeth is automatically corrected during the resetting operation, and the character member may always start its active operation from the proper position. As soon as the bell crank lever has been released by the character member the parts at the lower end of the lever return to initial position and the drum and character member frame are free to move in opposite directions relative to each other so that the next active dog on the drum may engage its bell crank lever and cause the actuation of the proper character member.

It is apparent that while the storage drum and transmitting element frame are mounted independently of each other the transmission from the drum to the transmitting element frame will tend to move the latter forwardly therewith, whereas the rotative tension on the transmitting element frame tends to return the latter to its initial position in a direction opposite to that of the rotation tension of the drum, the transmitting element member frame being stopped at its initial position, and the drum being adapted for actuating the bell crank levers from any position, and having no fixed point, but being freely revoluble or "floating." For this reason, when the escapement allows the drum to move forwardly, no effect is had on the transmitting element frame or its parts, as they merely revolve around the same center as the drum, so that should the keyboard be operated rapidly the drum will move one step for each key actuation, and if the sending of the characters is slower than the actuation of the keyboard, the transmitting element frame will be moved with the drum from its initial position. Inasmuch as the transmitting element frame is moved positively by the storage drum, because of the engagement of drum dogs with the bell crank levers of the character members, and as such movement is independent of the actuation of the character members themselves, it is apparent that the transmitting element frame may be moved with the drum a number of spaces while a single character is being sent, and that as rotative tension returns the frame to its initial position, its character members are set by the setting dogs previously accumulated in storage, in the sequence in which the dogs were set by the keyboard levers. It is apparent that in this way the accumulation may take place without interfering with the sending of the characters and that the accumulation is only limited by the number of setting dogs in each series in the drum.

Should the operator strike the wrong key the error may be corrected by means of the back spacer which moves the drum backwardly, so that the finger 163 of the setting dog which has been inadvertently rocked, will engage the shaft 259 and by it be returned to its initial position after which the operator may proceed to send the message correctly, the shaft 259 and back spacer key being so arranged that as the finger 163 passes into the curve of the lip 241 the shaft is rocked so that the lip pushes against the finger and helps to replace the dog.

Should it be desired to repeat a message, it is, of course, necessary to return the transmitting element frame to position for starting the part of the message to be repeated without interfering with the set positions of the setting dogs. This is accomplished by means of the knob 181 which may be pulled laterally to shift the collar 148 and lever 143 so that the slide 37 is moved to shift the lower arms of the bell crank levers out of position for contact with the setting dogs on the drum after which the transmitting element frame may be revolved backwardly by means of said knob until a starting position is reached, after which the slide may be returned to its initial position and the machine allowed to operate as before, the springs by which the dogs are held yieldingly in set position preventing the accidental return of said dogs.

It is apparent that after the message has been sent and while the drum is moving under rotative tension of the transmission, the shaft 259 will wipe the setting dogs and move same back to their lowered positions, so that they may be reset for succeeding operations, the resetting taking place either immediately after the message is sent or at such time as the part of the drum containing the set dogs is moved over the shaft 259.

The indicator at all times shows the number of accumulated dogs, due to the fact that as the transmitting element frame revolves it winds one rope 288 on its drum and pulls the tram across its track, the bell sounding as the transmitting element frame approaches its limit. After the tram has passed over the raised track, the bar 271 is raised by its springs 246 so that whenever a succeeding key lever is lowered, it must push said bar downwardly thereby stiffening the action of the key lever and indicating to the operator the position of the drum. As the drum approaches its limit of accumulation the tram moves the hook 293 beneath the hook 275 on the cross bar 271 and locks all of the key levers so that they cannot be depressed to set new trips, thereby requiring the operation to be discontinued until the storage drum has been relieved.

In regulating the speed of the governor, the rod 86 is moved outward by means of lever 90 against the tension of spring 88. If, however, it is desired to fix a minimum speed according to rules or regulations, the set screw 98 is turned so that the rod cannot be moved any farther than a certain limit, at which point the force of the lever 90 if moved farther will be taken up by spring 93, which is enough stiffer than the spring 88 to always allow the latter to yield first.

If the operator is accustomed to working at a certain speed he may set the stop 225 for that speed. With the stop set at the proper point, when he revolves the knob 227, to release the governor, he turns same until the pointer touches the stop, thereby obviating the necessity of watching the indicator each time the machine is started. In case he desires to transmit a little faster he may turn the knob 227 and move the pawl 224 along notches 229, or he may move the finger grip 223 in either direction.

While I have described the operation of the machine with the governor released for the entire period during which the keyboard is operated, it is apparent that the message may be set on the drum before the governor is released so that corresponding trips for all of the characters to be sent are accumulated in storage within the drum before any of the characters are sent. After such accumulation the governor may be released so that the transmitting element frame and the members carried thereby are operated as the parts assume their normal position under the rotative tension.

It is apparent that the description of structure and operation is that preferred and that variations may be made in both structure and operation without departing from the spirit of the invention.

Having thus described my invention, what I claim as new therein and desire to secure by Letters-Patent, is:

1. In a telegraph transmitter, an individual character member for each of a plurality of designated characters, a plurality of setting devices for each character member, means for actuating any of said setting devices to set the relative character member, and means for actuating any set character member immediately following its placement in storage.

2. In a telegraph transmitter, an individual character member for each of a plurality of designated characters, an individual group of setting devices for each character member, and means for effecting actuation of a character member immediately following its setting by a setting device.

3. In a telegraph transmitter, an individual character member for each of a plurality of designated characters, an individual group of setting devices for each character member adapted for functional accumulation in storage, key board mechanism for actuating the setting devices, and means for effecting actuation of a character member immediately following actuation of the key board mechanism on a relative setting device when the setting devices are operated from a home position and subsequently thereto when setting devices are in storage.

4. The combination with a movable transmitting element comprising a character member, of a setting element comprising a series of independently operable setting dogs, single means for moving any of said dogs to functional position, means in the transmitting element operable by a set dog to set the character member and means for tensioning the transmitting element toward the setting element.

5. The combination with a movable transmitting element comprising a character member and a positioning device, of a setting element comprising a series of movable setting dogs and means for setting the dogs in functional position, means for moving either of said elements to effect operative engagement of the setting dogs, and means for effecting operation of the character member following the setting operation.

6. The combination with a transmitting element comprising a character member and a positioning device, of a setting element comprising a series of movable setting dogs and means for setting the dogs in functional position, means for moving either of said elements to effect operative engagement of the setting dogs with the positioning devices, means for effecting operation of the character member following the setting operation, and a circuit closer operable by the active character member.

7. The combination with a transmitting element comprising a character member and positioning device, a rotatable carriage, a series of independent setting dogs pivotally mounted in the carriage and adapted for operative engagement with the positioning device, yielding means for retaining each dog in inoperative or operative position, and key mechanism for shifting any of said dogs to operative position and returning a previously set dog to inoperative position.

8. In combination with a carriage, a setting dog pivotally mounted in said carriage, and having members projecting from opposite sides thereof, means at one side of the carriage for rocking the dog to functional position, and a transmitting mechanism at the opposite side of the carriage engageable by said dog to set the transmitting mechanism.

9. In combination with a carriage, a setting dog pivotally mounted in said carriage and having members projecting from opposite sides thereof, means at one side of the carriage for rocking the dog to functional position, a transmitting mechanism at the opposite side of the carriage engageable by said dog to set the transmitting mechanism, and a resetting device operable by said means to return the set dog to normal position.

10. In combination with a carriage, a plurality of setting dogs mounted in said carriage and each having a member for projection at one side of the carriage to engage the transmitting mechanism and separate setting and retaining members at opposite sides of the carriage, means for engaging the setting members of said dogs to project its transmitting mechanism engaging member, and means operable by said setting means to engage the returning member of said dog to return said member to normal position.

11. In combination with a carriage movable in a circuit and comprising a plurality of setting dogs each having a member projecting from one side of the carriage to engage a transmitting mechanism, means at the opposite side of the carriage for shifting a dog to functional position at a setting point, and means movable synchronously with said setting means to return said dog to inactive position as it returns to the setting point.

12. In combination with a transmitting element comprising a character member and positioning device, a rotatable drum inclosing the transmitting element and having a series of circumferential openings, a setting dog pivotally mounted in each of said openings and having teeth projected inwardly and outwardly from the drum, and key mechanism for individually shifting the dogs.

13. The combination with a transmitting element comprising a character member and positioning device, of a rotatable drum inclosing the transmitting element and having a series of circumferential openings, a setting dog pivotally mounted in each of said openings and having toothed members projected inwardly and outwardly from the drum, yielding means for retaining each dog member at either limit of its travel, and key mechanism for individually shifting the dogs.

14. The combination with a transmitting element comprising a character member and positioning device, of a rotatable drum inclosing the transmitting element and having a series of circumferential openings, a setting dog pivotally mounted in each of said openings and having toothed members projected inwardly and outwardly from the drum, yielding means for retaining each dog member at either limit of its travel, and key mechanism for setting a dog on its primary movement and returning a previously set dog on its return movement.

15. The combination with a transmitting element comprising a character member and positioning device, of a rotatable drum comprising a plurality of individual members and means for connecting the members to form the drum, said drum being provided with radial openings, setting dogs pivotally mounted in said openings and having teeth projecting oppositely from the drum, a single spring for each of said dogs for frictionally retaining the dog in inoperative or operative position, and key mechanism for actuating the dogs.

16. In a telegraph transmitter, a character member, setting mechanism, a common driver for the character member and setting mechanism, and means whereby the setting mechanism is tensioned and the character member moved relative to each other.

17. In a telegraph transmitter, a character member, setting mechanism, a common driver for the character member and setting mechanism, and means whereby the setting mechanism is tensioned and the character member moved in opposite directions.

18. In a telegraph transmitter, a character member, setting mechanism, a common driver for the character member and setting mechanism, means whereby the setting mechnism is tensioned and the character member moved in opposite directions, and means for releasing the setting mechanism.

19. In a telegraph transmitter, a character member, a setting mechanism, a common driver for the character member and setting mechanism, means whereby the setting mechanism is tensioned and the character member moved in opposite directions, and means for releasing the setting mechanism to its tension independently of the movement of the character member.

20. In a telegraph transmitter, a character member frame and a setting mechanism adapted for revolution on a common axis, a common driver for moving the character member frame and setting mechanism in opposite directions, a character member in said character member frame, and means controlled by said character member for changing the direction of revolution of said character member frame.

21. In a telegraph transmitter, a character member frame and a setting mechanism adapted for revolution on a common axis, a common driver for moving the character member frame and setting mechanism and means for changing the direction of revolution of the character member frame.

22. In a telegraph transmitter, a character member frame and a setting mechanism adapted for revolution on a common axis, a common driver for tensioning the character member frame and the setting mechanism in opposite directions, a key for releasing said setting mechanism to its tension, means carried by the setting mechanism for moving the character member frame and setting mechanism in the same direction, and means carried by the character member frame for releasing said frame from said setting mechanism.

23. In a telegraph transmitter, a movable character member frame, character members mounted in the frame, means for actuating the character members independently of the movement of the frame, a setting mechanism adapted for actuation independently of the frame and character members, means adapted for shifting the character members, and setting devices in the setting mechanism adapted for operative engagement with said means.

24. In a telegraph transmitter, character and setting mechanisms independently mounted on a common axis, character members in the character mechanism and devices in the character and setting mechanisms respectively adapted for coöperation to determine the actuation of individual character members.

25. In a telegraph transmitter, character and setting mechanism adapted for rotation on a common axis and arranged one within the other, character members in the character mechanism, and means in the character and setting mechanisms for determining the actuation of individual character members.

26. In a telegraph transmitter, a character member frame, a setting mechanism having concentric mounting and character members eccentrically mounted in the frame and adapted for actuation from the setting mechanism.

27. In a telegraph transmitter, a character member frame, a plurality of independently operable character members in said frame, bearing members pivotally mounted in said frame and yieldingly tensioned in one direction, a driving member revolubly mounted in said bearing members and adapted for operative engagement with any of said character members, and a setting mechanism for moving any of the character members into engagement with said yieldable driving member.

28. The combination with a frame, of a driving member and brush carried by the frame, a lever pivotally mounted on the frame and having a character member revolubly mounted in one of its arms, a setting mechanism comprising means adapted for engaging a second arm of said lever, a carriage adapted for actuation by said second lever arm when the latter is rocked by the setting mechanism, a second carriage adapted for actuation by said first named carriage and for engaging the means by which said lever arm was rocked, and means for actuating said setting mechanism.

29. In a telegraph transmitter, the combination with a frame, of a driving member and brush carried by the frame, a lever having a character member revolubly mounted in one of its arms and adapted for engagement with the driving member and brush, a carriage pivotally mounted in the frame and having a member overlying the second arm of the lever, a second, pivotally mounted carriage adapted for actuation by the first named carriage, and setting mechanism comprising means adapted for operative engagement with the second arm of the character member lever and for locking engagement by said second carriage when said lever is rocked.

30. In a telegraph transmitter, the combination with a brush and driving member, of a carrying device, a character member on the carrying device adapted for operative engagement with the brush and driving member, a revoluble drum inclosing the carrying device, a plurality of setting members pivotally mounted in the drum and having portions projecting into and from the drum, and key members adapted for actuating said setting members.

31. In a telegraph transmitter, character mechanism comprising means for controlling the actuation of individual character-members, a revoluble drum inclosing the character mechanism, setting devices pivotally mounted in the drum and each having an inwardly projecting arm adapted for engaging the controlling means for the character mechanism and having an outwardly projecting arm, and key levers adapted for engaging said outwardly projecting arms to set said controlling means.

32. In a telegraph transmitter, character mechanism comprising means for controlling the actuation of individual character members, a revoluble drum inclosing the character mechanism, setting devices pivotally mounted in the drum and each having an inwardly projecting arm adapted for engaging the controlling means in the character mechanism and having an outwardly projecting arm, key levers adapted for engaging said outwardly projecting arms to set the controlling means, and means for returning said setting devices to initial position.

33. In a telegraph transmitter, a character mechanism comprising means adapted for setting individual character members, a revoluble drum inclosing the character mechanism, setting devices pivotally mounted in said drum and each comprising an inwardly projecting arm adapted for engaging a controlling means in the character mechanism and comprising a plurality of outwardly projecting arms, key levers adapted for engaging relative outwardly projecting arms of said setting devices to rock the devices to operative position, and common means adapted for engaging the other outer arms of said setting devices to return the latter to initial position.

34. In a telegraph transmitter, a character mechanism comprising means adapted for setting individual character members, a revoluble drum inclosing the character mechanism, setting devices pivotally mounted in said drum and each comprising an inwardly projecting arm adapted for engaging a controlling means in the character mechanism, and comprising a plurality of outwardly projecting arms, key levers adapted for engaging relative outwardly projecting arms of said setting devices to rock the devices to operative position, and common means for engaging the other outer arms of said setting devices to return the latter to initial position irrespective of the direction of travel of the drum.

35. In a telegraph transmitter, a character mechanism comprising means adapted for setting individual character members, a revoluble drum inclosing the character mechanism, setting devices pivotally mounted in said drum and each comprising an inwardly projecting arm adapted for engaging a controlling means in the character mechanism and comprising a plurality of outwardly projecting arms, key levers adapted for engaging relative outwardly projecting arms of said devices to rock the devices to operative position, common means for engaging the other outer arms of said setting devices to return the latter to initial position, and a spring for yieldingly holding each of the setting devices in initial or set position.

36. In a telegraph transmitter, a character mechanism, comprising an individual carrying device and a character member on each device, a revoluble drum inclosing the character mechanism and provided with a plurality of series of apertures, a setting device pivotally mounted in each aperture and comprising inwardly and outwardly projecting arms, a spring in each aperture adapted for holding the setting device in initial or set position, a key lever for each series adapted for engagement with an outwardly projected arm to rock the setting devices to set position, and common means for engagement therewith to return the latter to initial position.

37. In a telegraph transmitter, a movable transmitting element having a plurality of character members, a storage element having a plurality of setting dogs for functioning said character members, means for actuating said setting dogs to produce a mechanical record in said storage element prior to functioning said character members and means for moving said transmitting element relative to the storage element to transmit telegraphic characters.

38. In a telegraph transmitter, a storage element, means for establishing a record in the storage element, transmitting mechanism including individual character members and common means for actuating said members, means operable from the storage element for establishing functional relation between a character member and its actuating means, and means for locking said character member in functional relation during an operative period.

39. In a telegraph transmitter, a storage element, means for establishing a record in the storage element, transmitting mechanism including individual character members and common means for actuating said members, means operable from the storage element for establishing functional relation between a character member and its actuating means, and means for locking said character setting means to the storage element during an operative period of a character member.

40. In a telegraph transmitter, a storage element comprising a plurality of individual setting dogs for each of a series of character members, means for selectively setting said dogs, a transmitting element including a series of individually operable character members and a common driver for all of said members, a positioning device operable from a set dog in the storage element for moving its characters member to operative relation with the driving member, and means operable by said positioning device for locking said device to the storage element during operative periods of the character members.

41. In a telegraph transmitter, a storage element comprising a plurality of individual setting dogs for each of a series of character members, means for selectively setting said dogs, a transmitting element including a series of individually operable character members, and a common driver for all of said members, a positioning device operable from a set dog in the storage element, for moving its character member to operative relation with the driving member and means operable by said positioning device for locking said device to the storage element during operative periods of the character members, and operable by said device to disengage the dog upon the completion of said period.

42. In a telegraph transmitter, a storage element having primary movement in one direction and comprising a plurality of individually operable setting dogs for each of a series of character members, means for setting said dogs a transmitting mechanism having fundamental movement with respect to the storage element and comprising a plurality of individually operable character members and a driver common to all of said members, a positioning device for each character member engageable by a setdog to establish operative relation between the character member and the driving member and whereby the fundamental movement of the transmitting mechanism is interrupted during an operative period of a character member, and mechanism for effecting movement of the storage element transmitting mechanism and said common driver.

43. In a telegraph transmitter, a transmitting element having a plurality of character members, a storage element having a group of setting dogs for each character member, means for individually selecting a plurality of setting dogs to produce a mechanical record, and means for differentially driving said element to transmit telegraphic characters.

44. In a telegraph transmitter a transmitting element comprising a circuit closer and character members for actuating said circuit closer, a setting mechanism, a plurality of setting devices in said setting mechanism, means for moving the transmitting element relative to the setting mechanism and means for actuating said setting devices, whereby one or more setting devices may be successively accumulated in proper sequence to actuate said character members.

45. In a telegraph transmitter, a storage cylinder adapted for intermittent travel in one direction and a plurality of character members within said cylinder adapted for independent actuation therefrom and for intermittent travel in an orbit opposite to the travel of the cylinder.

46. In a telegraph transmitter, a storage cylinder, adapted for intermittent travel in one direction, means for manually controlling the intermittent travel of the cylinder, a plurality of character members within said cylinder adapted for successive actuation therefrom and tensioned for travel in an orbit opposite to the travel of the cylinder, and automatic means for regulating the rate of travel of the character members along their orbit.

47. In a telegraph transmitter, the combination with a brush and driver, of a plurality of character members each having a positioning member, a setting mechanism comprising setting devices adapted for rocking said positioning members, key levers adapted for actuating said setting devices, means for constantly tensioning the setting mechanism, and an escapement operable by any of said key levers for releasing said setting mechanism by steps.

48. In a telegraph transmitter, a character mechanism comprising means adapted for positioning individual character members, a revoluble drum inclosing the character mechanism, setting devices pivotally mounted in said drum, and each comprising an inwardly projecting arm adapted for engaging a positioning means in the character mechanism, an outwardly projecting arm having a laterally turned end adapted to engage the drum to limit the travel thereof in one direction, and a second outwardly projecting arm adapted to engage said drum to limit the travel of the device in the opposite direction, a spring for yieldingly holding said device at either limit of its travel, key levers adapted for engaging the laterally turned ends of said first named outwardly projecting arms to rock the devices to operative position, and common means adapted for engaging the second outwardly projecting arms to return the devices to initial position.

49. In a telegraph transmitter, a transmitting element, comprising a plurality of members for forming telegraphic characters, means for actuating said character members at times, a governor for regulating the speed of actuation of said character members, means on said character members for determining the length of the actuating period of each member, a storage member and setting mechanism on said storage member for positioning said character members into active position.

50. In a telegraph transmitter, a transmitting element adapted for intermittent travel, a plurality of character members in said transmitting element for forming telegraphic characters, means operable from the character members for automatically regulating the speed of intermittent travel, a storage element surrounding said transmitting element, a plurality of setting dogs for successively setting said character members to functional position, and a keyboard for variably setting said dogs to functional position.

51. The combination with a storage element, a setting dog in said element and means for functioning said dog, of a transmitting element, a character member in said transmitting element, and means for actuating said character member from said dog immediately on functioning said dog.

52. In a telegraph transmitter, a storage element, means for producing a record on said element, a transmitting element comprising character members operable from the record on said storage element, and means for releasing said transmitting element to actuate said character members at the same moment the storage record is started to transmit telegraphic characters.

53. In a telegraph transmitter, a storage element, means for producing a record on said storage element, a transmitting element comprising permanently fixed character members operable from the record on said storage element, and means for releasing said transmitting element after the storage record is started to transmit telegraphic characters.

54. In a telegraph transmitter, a storage element, a plurality of setting dogs in said storage element, a keyboard for functioning relative dogs in the storage element, a transmitting element comprising character members operable from said dogs and means for moving one of said elements relative to the other for cofunctioning said dogs and character members to transmit telegraphic characters.

55. In a telegraph transmitter, a storage element, a plurality of setting dogs in said storage element, a keyboard for functioning relative dogs in the storage element, a transmitting element comprising character members operable from said dogs and means for moving both of said elements relative to each other for cofunctioning said dogs and character members to transmit telegraphic characters.

56. In a telegraph transmitter, a storage element, a plurality of setting dogs in said storage element each corresponding to a complete telegraphic symbol, means for functioning said dogs to the capacity of said storage element but one, a transmitting element operable from said dogs to transmit telegraph characters and means for moving said elements relative to each other to transmit the character corresponding to the last dog stored.

57. In a telegraph transmitter, a storage element, a transmitting element and a single prime mover operable on both of said members but adapted for driving one of said elements without the other to store telegraph characters prior to transmission.

58. In a telegraph transmitter, a storage element, a transmitting element, a character element in said transmitting element, and a single prime mover for driving all of said elements to transmit telegraph characters.

59. In a telegraph transmitter, a storage element, a transmitting element, a character element in said transmitting element and a single prime mover for imparting intermittent motion and rotary motion respectively to said storage and transmitting elements to transmit telegraph characters.

60. In a telegraph transmitter, a storage element, a transmitting element, a character element in said transmitting element and a single prime mover for imparting motion to any of said elements without affecting the movement of the others.

61. In a telegraph transmitter, a supporting frame, a transmitting element having end shafts revolubly mounted in said frame, a storage element revolubly mounted on said shafts, a disk rigidly mounted on one of said shafts, a pin located in said frame adjacent said disk and an ear on said disk adapted to contact with said pin to determine the maximum and minimum positions of said transmitting element relative to the storage element.

62. In a telegraph transmitter, an inclosing case, a stationary support, a circuit terminal grounded on said support, a character mechanism revolubly mounted in said support and comprising individually operative character members and a brush, a movable contact bracket carried by said mechanism and insulated from but adapted for actuation by the brush, a contact member carried by but insulated from the revoluble character mechanism, a brush having insulated mounting on the stationary frame and contacting said contact member, a line terminal grounded on said case, a second line terminal insulated from the case and connected with said last named brush, and a switch on said case for closing said line terminals.

63. In a telegraph transmitter, character mechanism, means operable by the character mechanism for sending selected characters, means for selecting the characters, and means for reversing the sending means without interfering with the selecting means whereby a message may be repeated from the character mechanism.

64. In a telegraph transmitter, transmitting and setting elements movable relative to each other, and means for reversing movement of one of the elements without interfering with the setting element.

65. In a telegraph transmitter, the combination with a moyable transmitting element, comprising individual character members, of a setting element movable independently of the transmitting element, trip mechanism in said elements adapted for coöperation to position selected character members, means for shifting one of the elements to render the trip mechanism inoperative, and means for resetting said element to operative position.

66. In a telegraph transmitter, character members and setting mechanism adapted for sending a message, levers adapted for actuation by said setting mechanism for positioning said character members and means for laterally shifting said levers, whereby a message may be repeated without resetting the setting mechanism.

67. In a telegraph transmitter, character members, setting dogs for positioning the character members, a setting mechanism, means for actuating the setting dogs to rock the character members, means for reversing the setting mechanism to repeat a message, and means for shifting the setting dogs out of the path of the setting mechanism.

68. In a telegraph transmitter, a storage element comprising a plurality of individually operable setting dogs, means for setting the dogs, transmitting mechanism comprising a plurality of individually operable character members and a positioning device for each character member operable from a dog in the storage element, common driving mechanism for the storage element and transmitting mechanism, means for disconnecting the transmitting mechanism from said driving means, and means for effecting reverse travel of the positioning devices without interference from the dog in the storage element.

69. In a telegraph transmitter, a storage element comprising a plurality of individually operable setting dogs, means for setting the dogs, transmitting mechanism comprising a plurality of individually operable character members and a positioning device for each character member operable from a dog in the storage element, common driving mechanism for the storage element and transmitting mechanism, means for disconnecting the transmitting mechanism from said driving means, means for varying the relation between the positioning devices and setting dogs and means for reversing travel of one of the members to effect a repeat of all or part of the members.

70. In a telegraph transmitter, a character member frame and setting mechanism revolubly mounted on a common axis independently of each other, character members revolubly mounted in said frame, common driving mechanism for revolving the setting mechanism and frame and actuating the character members, and means for disconnecting the frame from said driving mechanism and actuating same independently of the other parts.

71. The combination with transmitting and setting elements rotatable on a common axis, individual character members in the transmitting element, trips in the transmitting and setting elements for selecting determined character members, means for setting the trips in the setting element, and means for shifting the transmitting element, to throw the transmitting element trips out of operative relation to the setting trips.

72. The combination with transmitting and setting elements rotatable on a common axis, individual character members in the transmitting element, trips in the transmitting and setting elements for positioning determined character members, means for setting the trips in the setting element, means for shifting the transmitting element to throw the transmitting element trips out of operative relation to the setting trips, and for reversing travel of the transmitting element.

73. The combination with transmitting and setting elements rotatable on a common axis, individual character members in the transmitting element, trips in the transmitting and setting elements for positioning determined character members, means for setting the trips in the setting element, means for shifting the transmitting element to throw the transmitting element trips out of operative relation to the setting trips, and locking mechanism for holding the transmitting element in shifted position.

74. In a telegraph transmitter, character members, trip members for positioning the character members, a setting mechanism, means for actuating the setting mechanism to rock the character members, means for reversing the selecting mechanism to repeat a message, and means for shifting the trip members out of the path of the setting mechanism.

75. In a telegraph transmitter, a setting mechanism having suitable setting devices, a plurality of carrying members having portions adapted for projection into the path of active setting devices, character members mounted on the carrying members, a brush and a driver adapted for engagement by the character members, and means for shifting said carrying devices to move same out of the path of active setting devices in the setting mechanism.

76. In a telegraph transmitter, a character member frame and setting mechanism revolubly mounted on a common axis independently of each other, character members revolubly mounted in said frame, common driving mechanism for revolving the setting mechanism and frame and actuating the character members, and means for disconnecting the frame from said driving mechanism and actuating same independently of the other parts.

77. In a telegraph transmitter, a supporting frame, a sleeve slidably mounted in said frame, a shaft mounted in said sleeve, a character member frame fixed on said shaft, character mechanism mounted in said frame, a gear wheel revolubly mounted on said sleeve and adapted for sliding travel therewith, transmission between said gear wheel and the character mechanism, a prime mover adapted for driving said gear wheel, a second gear wheel fixed on said sleeve, and a slidable handle shaft having a gear wheel meshing with and flange members extending over said second gear wheel, whereby the sleeve may be moved longitudinally on the character frame shaft to break the transmission and whereby said sleeve may be revolved.

78. In a telegraph transmitter, an inclosing case, a frame located within said case, bearings in said frame, a sleeve revolubly mounted in one of said bearings, shaft members revoluble in said sleeve and in the other bearing, a character member frame fixed on said shafts, character members in said frame, a setting mechanism having spiders revolubly mounted on said sleeve and one of said shafts respectively, one of said spiders having a clutch face, a collar on one of said frame bearings and partially inclosing said sleeve, a gear wheel revolubly mounted on said collar, a shaft revolubly mounted in one of said spiders, gear wheels on said last named shaft meshing with the gear wheels on the sleeve and collar respectively, transmission from the character mechanism comprising a gear wheel on said sleeve having a clutch face adapted for coöperation with the clutch face on said spider, a gear wheel fixed on said sleeve, a shaft revolubly mounted in the inclosing case, a gear wheel fixed on said shaft and meshing with the gear wheel fixed on said sleeve, and having flanges partially inclosing said last named gear wheel, and a handle on said shaft exterior to the case whereby said sleeve may be moved longitudinally to engage the clutches on the inner gear wheel and spider, and move said inner gear wheel out of mesh with the transmission gear.

79. In a telegraph transmitter, transmitting and setting mechanisms adapted for independent, revoluble movement, character members in the transmitting mechanism, each having a trip member, setting devices in the setting mechanism adapted for engaging said trip members, means for actuating the setting mechanism, the transmitting mechanism and character members, including gear wheels for actuating the transmitting mechanism as a whole and character members individually, and means for simultaneously shifting one of said gear wheels to break connection to the transmitting mechanism and shift said trip members out of the path of the setting devices.

80. In a telegraph transmitter, a character member frame, character members, mounted in the frame and each comprising a trip, transmission mechanism connected with the character members and comprising a gear wheel, a setting mechanism, means for actuating the setting mechanism comprising a gear wheel, a gear wheel common to both the setting mechanism and character member gears, means for sliding said common gear wheel out of mesh with the character member gear, a slide adapted for contacting the character member trips, and means adapted for simultaneously moving said common gear wheel out of mesh with the character member gear and actuating said slide to shift said trips out of operative relation to the setting mechanism.

81. In a telegraph transmitter, a character member frame, character members mounted in the frame and each comprising a trip, transmission mechanism connected with the character members and comprising a gear wheel, a setting mechanism, means for actuating the setting mechanism comprising a gear wheel, a gear wheel common to both the setting mechanism and character member gears, means for sliding said common gear wheel out of mesh with the character member gear, a slide adapted for contacting the character member trips, means adapted for simultaneously moving said common gear wheel out of mesh with the character member gear and actuating said slide to shift said trips out of operative relation to the setting mechanism, and clutch members on the setting mechanism and common gear wheel adapted to mesh when said common gear wheel is shifted to release the character members.

82. In a telegraph transmitter, storage and transmitting elements, means for recording a plurality of characters in said storage element, means for repeating characters in said storage element, and an indicator for indicating the number of characters repeated.

83. In a telegraph transmitter, storage and transmitting elements, means for recording a plurality of characters in said storage element, means for moving said transmitting element relative to said storage element to repeat said recorded characters, and an indicator connected with said transmitting element for indicating the number of characters repeated.

84. In a telegraph transmitter, a setting mechanism comprising setting devices, a character member frame comprising individual character members, each having a member adapted for actuation by said setting devices, a slide adapted for engaging said members and means for actuating said slide to move said member out of the path of said setting devices.

85. In a telegraph transmitter, a revoluble setting mechanism comprising setting devices and having a clutch face, a character member frame, character members in said frame each having a trip member, transmission for actuating said character members comprising a gear wheel, a slidable gear wheel having a clutch face adapted for meshing with the face on said setting mechanism, a slide having members adapted for engagement with said trips, means for yieldingly retaining said slide in inoperative position, a lever pivotally connected with said sliding gear and adapted for actuating said slide, and means for sliding said gear.

86. In a telegraph transmitter, a storage element, a transmitting element operable from said storage element to transmit telegraph characters, and means for effecting preliminary reverse movement of the transmitting element to effect repeat of all of said characters.

87. In a telegraph transmitter, a storage element, a transmitting element operable from said storage element to transmit telegraph characters, and means for repeating a selected number of said characters.

88. In a telegraph transmitter, storage and transmitting elements, means for recording a plurality of characters in said storage element, and means for returning one of the elements in a direction opposite to its normal travel to repeat characters in said storage element.

89. In a telegraph transmitter, storage and transmitting elements, means for recording a plurality of characters in said transmitting element, and means for moving said transmitting element backwardly relative to said storage element to provide for retraverse of the selective portion of the storage element to repeat said recorded characters.

90. In a telegraph transmitter, a character member frame and setting mechanism concentrically mounted one within the other, character members independently mounted in said frame and having individual trips, setting devices in the setting mechanism adapted for positioning said trips, means for actuating the character members and for revolving the character member frame and setting mechanism, an escapement for controlling travel of the setting mechanism, key levers for actuating the setting devices and the escapement and a back spacer adapted for moving said setting mechanism against the tension of the driving member.

91. In a telegraph transmitter, a storage element, a keyboard, means for producing a record of the keyboard in said storage element, means operable from said record for transmitting telegraphic characters, and an erase key in the keyboard for successively eliminating all or part of the record in the storage element.

92. In a telegraph transmitter, a storage element, a keyboard, means for producing a record of the operation of said keyboard in said storage element, character members operable from said record for transmitting telegraphic characters and an erase key for successively eliminating one or more characters in the record, individually upon operation of the erase key.

93. In a telegraph transmitter, the combination with character members, of a revoluble drum inclosing and adapted for actuating said character members, means for yieldingly revolving said drum, means for controlling the actuation of the drum, and back spacer adapted for actuating the drum against the tension of its revolving means for preventing the actuation of said character members.

94. In a telegraph transmitter, character mechanism, a revoluble drum, setting devices carried by the drum and adapted for actuating the character mechanism, means for yieldingly revolving the drum, and a back spacer adapted for actuating said drum against the tension of its driving mechanism.

95. In a telegraph transmitter, storage and transmitting elements, means for recording a plurality of words in said storage element, and means for moving said transmitting element relative to the storage element to eliminate any number of said words.

96. In a telegraph transmitter, a storage element and a transmitting element movable relative to the storage element in a functioning path to effect transmission or in a shunt path to avoid transmission.

97. In a telegraph transmitter, a storage element comprising members settable to effect selection of characters for transmission, a transmitting element coöperative with said members and movable in a functioning path to effect transmission of characters corresponding to set members in the storage element, and movable in a shunt path to eliminate any desired number of members.

98. In a telegraph transmitter, a storage element comprising members settable to effect selection of characters for transmission, a transmitting element coöperative with said members and movable in a functioning path to effect transmission of characters corresponding to set members in the storage element, and movable in a shunt path to eliminate any desired number of members from transmission, without returning storage members to unset position.

99. In a telegraph transmitter, a storage element comprising members settable to effect selection of characters for transmission, a transmitting element movable along said members in a functioning path to effect transmission of characters corresponding to set members in the storage element or in a shunt path in either direction to effect repeat or elimination of a selected number of members in the storage element.

100. In a telegraph transmitter, a storage element comprising members settable to effect selection of characters for transmission, a transmitting element movable along said members in a functioning path to effect transmission of characters corresponding to set members in the storage element or in a shunt path in either direction to effect repeat or elimination of a selected number of members in the storage element and manually operable means for shifting the transmitting element and operating the same in its shunt path.

101. The combination with a transmitting element comprising character members and positioning devices, of a setting element comprising setting dogs for the positioning devices, means for setting said dogs, means for actuating the setting element, an erase key lever, means operable by the lever for inducing reverse movement of the setting element, and separate means for returning said dogs to initial position.

102. In a telegraph transmitter, a storage element comprising a plurality of individually operated setting dogs, a transmitting element comprising character members and positioning devices engageable by the setting dogs to position the character members, an erase key lever and a pawl on said lever engageable with the storage element to effect reverse movement thereof.

103. In a telegraph transmitter, a storage element comprising a plurality of individually operable setting dogs, a transmitting element comprising character members and positioning devices engageable by the setting dogs to position the character members, an erase key lever and a pawl on said lever engageable with the storage element to effect reverse movement thereof, yieldable means urging said pawl to operative engagement with the storage element and a stop on the pawl for limiting movement thereof.

104. In a telegraph transmitter, a storage element comprising a plurality of setting devices, a transmitting element comprising a plurality of individually operable character members engageable with the setting devices of the storage element, a ratchet on the storage element, an erase key lever, a pawl pivotally mounted on the said lever and having a stop for engagement therewith to limit movement of the pawl in one direction and a spring connecting the lever and pawl and normally urging the pawl to engagement with the ratchet on the storage element.

105. In a telegraph transmitter, storage and transmitting elements, means for recording a plurality of characters in said storage element, means for eliminating any number of characters from said storage element, and an indicator connected with said transmitting element for indicating the number of characters eliminated.

106. In a telegraph transmitter, a revoluble frame, a plurality of carrying members movably mounted on said frame, eccentric to the frame mounting, a character member revolubly mounted on each of said carrying members, a common driver for all of said character members, a setting mechanism for actuating said carrying members to shift the positions of the character members, a circuit closer adapted for actuation by any of the character members, and a latch for holding a carrying member in active position for a complete phase of its character member.

107. In a telegraph transmitter, the combination with a frame, of a driving pinion, a bank of levers eccentrically mounted on the frame, a character member carried by one arm of each lever, a setting mechanism adapted for rocking said levers to move the character members into driving relation with the pinion, a circuit closer adapted for actuation by any of the character members, and a latch for each lever adapted for holding same in set position for each phase of the character member carried thereby.

108. In a telegraph transmitter, a suitable frame, a driving pinion, a brush mounted on the frame, a lever pivotally mounted on the frame and having a character member revolubly mounted in one of its arms and comprising a gear wheel adapted for meshing with the driving pinion and character teeth adapted for contact with said brush, a setting mechanism adapted for rocking said lever to move the character member into operative relation with the pinion and brush, a latch adapted for automatic movement into holding relation with the lever following the rocking of the lever by the setting mechanism, and means on the character member and latch whereby the latch is rocked to release the lever after each phase of movement of the character member.

109. In a telegraph transmitter, the combination with a driving pinion and brush; of a pivotally mounted lever; a character member revolubly mounted in one arm of said lever and comprising a gear wheel adapted for meshing with said pinion, character teeth adapted for engaging said brush, and latch teeth; setting mechanism for rocking the lever, a latch having an arm adapted for holding the lever in operative position, and an arm for engaging the latch teeth on said character member to set the character member when the latter is inert and whereby the latch is rocked after each phase of movement of the character member.

110. In a telegraph transmitter, the combination with a brush and a driving mechanism, of a carrying device, a character member freely mounted on the carrying device and adapted for actuation from the driving mechanism, said character member comprising character teeth adapted for contacting the brush and having latch teeth, a setting mechanism adapted for actuating the carrying device, and a latch adapted for cooperation with the latch teeth on the character member to set the character member with the character teeth thereof in determined relation to the brush.

111. In a telegraph transmitter, the combination with a brush and a driving mechanism, of a carrying device, a character member freely mounted on the carrying device and adapted for actuation from the driving member, said character member comprising character teeth adapted for contacting the brush and having latch teeth, a setting mechanism adapted for actuating the carrying device, and a latch adapted for holding the carrying device in operative position and for automatically setting the character member in determined relation to the brush at each actuation of the carrying device.

112. In a telegraph transmitter, the combination with a brush and driving pinion, of a movable carrying device, a character member revolubly mounted on said carrying device and comprising a gear wheel adapted for engaging the driving pinion, a ring on one face of the gear wheel having character teeth on its periphery adapted for contacting the brush, and having latch points on its inner periphery, a plate on said gear wheel within said ring having a notched periphery, a latch member having an arm adapted for holding the carrying device in active position, an arm adapted for engaging the ring points and the notched plate of the character member, and a spring arm having a spring connected therewith and with the carrying device.

113. In a telegraph transmitter, the combination with a driving member and brush, of a lever having a character member revolubly mounted in one of its arms and adapted for engaging the driving member and brush, a setting mechanism adapted for engaging a second arm on said lever to rock the character members into active position, and a lock for holding said second lever arm and setting mechanism together during an operative phase of the character member.

114. In a telegraph transmitter, a circuit closer, means for actuating said circuit closer at various fixed speeds to form a telegraphic character, a setting mechanism for tripping said actuating means into active position, and means on said actuating means for determining the active period thereof.

115. In a telegraph transmitter, a circuit closer, means for actuating said circuit closer at various mechanically regulated speeds to form a telegraphic character, a setting mechanism for tripping said actuating means into active position, and means on said actuating means for determining the active period thereof.

116. In a telegraph transmitter, a circuit closer, character members for actuating said circuit closer, a setting mechanism having a plurality of setting devices for tripping said character members into functional position, and means on said character members for determining the active period thereof.

117. In a telegraph transmitter, transmitting and storage elements, a plurality of character members having variously spaced characters, means for setting the character members from the storage elements, means for driving said character members and a correcting device for said character members for producing equally spaced transmission of characters.

118. In a telegraph transmitter, transmitting and storage elements, a plurality of character members of the same diameter in said transmitting element bearing the characters of a telegraph code, means for driving said character members and a correcting device for producing equally spaced transmission of characters.

119. In a telegraph transmitter, transmitting and storage elements, a plurality of character members of the same diameter in said transmitting element and having a plurality of characters spaced upon the periphery in proportion to the length of said characters, means for driving said character members, and a correcting device for equalizing the spaces between characters in proportion to the length of said characters.

120. In a telegraph transmitter, transmitting and storage elements, a plurality of character members in said transmitting element having unequally spaced characters thereon, means for driving said character members, and a correcting device for producing equally spaced transmission of characters.

121. In a telegraph transmitter, a transmitting element and a storage element, a plurality of character members of the same diameter having unequally spaced characters thereon, means for driving said characters, and a correcting device for producing equally spaced transmission of characters.

122. In a telegraph transmitter, a transmitting element and a storage element, a plurality of character members of the same diameter having unequally spaced characters thereon, means for holding said character members in neutral position, means for driving said character members to transmit telegraphic characters, means for holding said character members in driving position, a cam for tripping said members at the completion of a character and means for automatically correcting the spacing of characters through the tripping means.

123. In a telegraph transmitter, a revoluble frame, a plurality of carrying members movably mounted on said frame eccentric to the frame mounting, a character member revolubly mounted in each of said carrying members, a circuit closer adapted for actuation by any of said character members, a common driver for all of said character members, a setting mechanism for actuating said carrying members, a latch for holding a carrying member in active position for a complete phase of its character member, and means on said character member for tripping said latch.

124. In a telegraph transmitter, a revoluble frame, a plurality of angular carrying members pivotally mounted in said frame, eccentric to the frame mounting and having guided relation with the frame, character members revolubly mounted on each of said carrying members, a common driver for all of said character members, a setting mechanism for actuating said carrying members to shift the positions of the character members, a circuit closer adapted for actuation by any of the character members, a latch for holding the carrying member in active position, an internal cam on said character member for tripping said latch at the completion of one phase of its character member, and an external cam having peripheral notches for receiving said latch to maintain said character member in position.

125. In a telegraph transmitter, a revoluble frame, a plurality of angular carrying members pivotally mounted in said frame eccentric to the frame mounting and having guided relation with the frame, character members revolubly mounted on each of said carrying members, a common driver for all of said character members, a setting mechanism for actuating said carrying members to shift said character members into mesh with the common driver, a circuit closer adapted for actuation by any of the character members, a latch for holding the carrying member in active position, an internal cam on said character member for tripping the latch at the end of one phase of its character member, a spring for tensioning said latch toward locking relation with the carrying member, and for tensioning the carrying member toward inoperative position, and an external cam having peripheral notches for receiving said latch after said latch has been tripped by said internal cam.

126. In a telegraph transmitter, a revoluble frame, a plurality of angular carrying members pivotally mounted in said frame eccentric to the frame mounting, character members revolubly mounted on each of said carrying members, a common driver for all of and normally disengaged from said character members, a circuit closer having fingers adapted for actuation by and normally spaced from said character members, a setting mechanism for actuating said carrying members to shift said carrying members into mesh with the common driver and with the circuit breaker, a latch for holding the carrying member in active position, and means on the character member for tripping the latch at the completion of one phase of movement of the character member.

127. In a telegraph transmitter, a plurality of character members having variously spaced characters, means for driving said character members and a correcting device operable on each character member to position the same for producing equally spaced transmission of characters.

128. In a telegraph transmitter, a transmitting element, a plurality of character members of the same diameter in said transmitting element bearing the characters of a telegraph code, means for driving said character members and a correcting device for producing equally spaced transmission of signals.

129. In a telegraph transmitter, a character member having odd spaced character sections, means for yieldingly driving said character member, means for locking said character member in operative engagement with the driving member during the functional period thereof, and means carried by the locking means for correcting the odd spacing of said character sections.

130. In a telegraph transmitter, a character member having odd spaced character sections, cushioned means for driving said character member, means for moving said character member into operative engagement with the driving means, a latch for locking said character member in the latter position during the functional period thereof and means for tripping said latch to correct the odd spacing of the character sections.

131. In a telegraph transmitter, a character member comprising a gear, a character ring fixed to said gear and having a plurality of equally spaced groups of character forming teeth, the groups not being spaced according to the standard code, a yieldable driver for actuating said character member, a brush operable from said character ring for transmitting telegraph characters and a correcting device coöperatively connected with said character member whereby the transmitted characters are spaced according to the standard code.

132. In a telegraph transmitter, a character member comprising a gear, a character ring fixed to said gear and having a plurality of groups of character forming teeth, the groups not being spaced according to the standard code, a brush operable from said character ring, a plurality of teeth projecting inwardly from said ring and definitely located relative to said character groups, a plate fixed to said gear and having a plurality of notches corresponding in number to said inwardly projecting teeth and in offset relation thereto a distance equivalent to the difference in the length of the space between groups on the character ring and the characters in a standard code, a latch operable between corresponding inwardly projecting teeth and notches to rectify said difference in spacing, and means for driving said character member to transmit telegraph characters.

133. In a telegraph transmitter, a plurality of character members, each comprising a gear and a character ring, the character rings having groups of character forming teeth spaced equally on the same ring but spaced differently on different rings in proportion to the length and number of characters on the ring, inwardly projecting teeth on said character rings corresponding in number and definitely located relative to the teeth groups on the rings, plates fixed to the character gears and having notches corresponding in number to the inturned teeth on the character rings, and said notches being offset from the inturned teeth a distance equal to the difference in spacing of characters on the different rings, latches operable between corresponding inturned teeth and notches to equalize said difference in spacing, a brush operable from said character ring and a gear for driving said character members to transmit equally spaced telegraph characters.

134. In a telegraph transmitter, a transmitting element, a plurality of character members of the same diameter having unequally spaced characters thereon, means for holding said character members in neutral position, means for driving said character members to transmit telegraph characters, means for holding said character members in driving position, a cam for tripping said members at the completion of a character and means for automatically correcting the spacing of characters through the tripping means.

135. In a telegraph transmitter, the combination with a brush and driving member, of a carrying device, a character member revolubly mounted on said carrying device and adapted for operative engagement with the driving member and brush, said character member comprising character teeth and latch teeth, the latter having inclined faces, and a latch adapted for holding the character member in a determined set position and for engagement with the inclined face to automatically move the character member to such determined set position after each operative engagement with the brush.

136. In a telegraph transmitter, the combination with a driving member and brush, of a movable carrying device, a character member revolubly mounted on said carrying device and adapted for operative engagement with the driving member and brush, latch members on the character member arranged in different paths, a latch for each of the carrying devices comprising an arm adapted for holding the carrying devices in active position, and a second arm adapted for engagement by a latch member on a character member to hold the latter in set position or by another latch member on the character member to rock said latch, and selecting mechanism for actuating the carrying device.

137. The combination with a plurality of character members, of a swinging frame, a clash gear mounted in said frame, means for actuating the clash gear, yielding means for urging the clash gear to functional position, and means for selectively setting the character members in operative relation to the clash gear.

138. The combination with a torsion shaft, of arms on the torsion shaft, a shaft rotatably mounted in said arms, a clash gear on said shaft, meshing gear wheels on the clash gear and torsion shaft, means for actuating the gear wheel on the torsion shaft, yielding means for urging the arms in one direction, a plurality of independently operable character members, and selective mechanism for setting the character members in operative relation with the clash gear.

139. In a telegraph transmitter, a plurality of independently operable character members, a yieldable driver adapted for actuating any of said character members, a common circuit closer, and a revoluble setting mechanism adapted for moving any of the character members into operative engagement with the yieldable member and circuit closer.

140. In a telegraph transmitter, a revoluble frame, a plurality of carrying members movably mounted on said frame, eccentric to the frame mounting, a character member revolubly mounted on each of said carrying members, a common driver for all of said character members, a setting mechanism for actuating said carrying members to shift the positions of the character members, and a circuit closer adapted for actuation by any of the character members.

141. In a telegraph transmitter, a revoluble frame, a plurality of character members revolubly mounted in the frame, a pinion swingingly mounted in said frame and adapted for engagement by the character members, setting mechanism for determining the engagement of the character members with the pinion, comprising lever arms and an independently movable member having setting dogs adapted for positioning said arms, key members for actuating said dogs and driving mechanism for actuating said pinion the revoluble frame and the independently movable member.

142. In a telegraph transmitter, a revoluble frame, carrying devices pivotally mounted in said frame, character members carried by said devices, a brush adapted for contact with the character members, means for driving the character members, setting mechanism adapted for actuating the carrying devices, an indicator and flexible means connected with the indicator and adapted for winding oppositely with the frame.

143. In a telegraph transmitter, a character member frame, character members contained within the frame, setting mechanism adapted for positioning the character members, key levers for actuating the setting mechanism, bars adapted for actuation by said key levers, a track connected with said bars, a tram adapted for travel on said track, means connecting opposite ends of the tram with said character member frame, and a pointer connected with said tram.

144. In a telegraph transmitter, a character member frame, character members contained within the frame, setting mechanism adapted for positioning the character members, key levers for actuating the setting mechanism, bars adapted for actuation by said key levers, a track connected with said bars, a tram adapted for travel on said track, means connecting opposite ends of the tram with said character member frame, a pointer connected with said tram, said track having a raised portion adapted for engagement by the tram to lower said bars out of operative relation to the key levers.

145. In a telegraph transmitter, a character member frame, character members contained within the frame, setting mechanism adapted for positioning the character members, key levers for actuating the setting mechanism, bars adapted for actuation by said key levers, a track connected with said bars, a tram adapted for travel on said track, means connecting opposite ends of said tram with said character frame for moving said tram, a roller on said tram, a bell, a clapper for said bell, and a lever arm connected with said clapper and adapted for actuation by said roller.

146. In a telegraph transmitter, a stationary frame, a character member frame revolubly mounted in said frame, a plurality of character members contained within the character member frame, a setting mechanism adapted for positioning the character members, key levers for actuating the setting mechanism, a bar yieldingly held against the base of said key levers, and having rearwardly extending ends pivotally mounted on said frame and adapted for actuation by said key levers, a track on said bar and extending above and spaced from said key levers, a track on said stationary frame in line with said movable track, a tram having grooved rollers adapted for travel on both of said tracks, means connecting opposite ends of said tram with said character member frame for moving said tram along its tracks, a trip roller on said tram, a bell on said stationary frame, a rod pivotally mounted on said stationary frame, a clapper on said rod for ringing said bell, and levers projecting from said rod in the path of said trip roller whereby said bell is sounded at the maximum and minimum limits of said tram.

147. In a telegraph transmitter, a stationary frame, a character member frame revolubly mounted in said frame, a plurality of character members contained within said character member frame, a setting mechanism revolubly mounted on and inclosing said character member frame and adapted for positioning the character members, key levers for actuating the setting mechanism, a bar yieldingly held against the base of said key levers, and having rearwardly extending ends pivotally mounted on said frame and adapted for actuation by said key levers, a track on said bar and extending above and spaced from said key levers, a track on said stationary frame in line with said movable track, a tram having grooved rollers adapted for travel on both of said tracks, a drum on each end of said character member frame, a cable secured to each end of said tram and oppositely wound on said drums to move the tram along its track, a trip roller on said tram, a bell on said stationary frame, a rod pivotally mounted on said stationary frame, a clapper on said rod for ringing said bell, and levers projecting from said rod in the path of said trip roller, whereby said bell is sounded at the maximum and minimum limits of said tram.

148. In a telegraph transmitter, a character member frame, character members contained within said frame, a setting mechanism for actuating said character members revolubly mounted on and adapted to inclose said character member frame and tensioned in opposite directions, key levers for actuating said setting mechanism in one direction at an arbitrary speed, a governor for permitting opposite rotation of said character member frame at a fixed speed, and a visible indicator for recording the relative position of said character member frame and said setting mechanism.

149. In a telegraph transmitter, storage and transmitting elements, means for driving said elements to transmit telegraphic characters, and an indicator connected with said transmitting element for indicating the speed at which each character is being sent.

150. In a telegraph transmitter, a character member frame, character members contained within said frame, mechanism for positioning the character members, a bank of yieldingly tensioned key levers for actuating said mechanism, and means for automatically supplementing the tension on said key levers.

151. In a telegraph transmitter, a character member frame, character members contained within said frame, setting mechanism for positioning the character members, a governor for regulating the speed of travel of said character member frame, a bank of yieldable key levers for actuating said setting mechanism at an arbitrary speed and in advance of said character member frame, and means for supplementing the tension on the key levers when the setting mechanism has reached a certain point in advance of the character member frame.

152. In a telegraph transmitter, a storage element, means for producing a record on said element, a transmitting element operable from the storage record to transmit telegraph characters, and means for applying increased tension on said record producing means when the storage element is nearing its maximum capacity.

153. In a telegraph transmitter, a storage element, means for producing a record on said element, a transmitting element operable from the storage record to transmit telegraph characters and means for applying increased tension on said record producing means when the storage element is nearing its minimum capacity.

154. In a telegraph transmitter, a storage element, a transmitting element operable from said storage element to transmit telegraph characters, means for repeating said characters and an indicator to indicate the number of characters repeated.

155. In a telegraph transmitter, character mechanism including individually operative character members, a setting mechanism including setting devices adapted for determining the actuation of the individual character members, and a positive driving mechanism adapted for positively actuating the individual character members and for actuating the character and setting mechanisms by rotative tension from the positive driving mechanism.

156. In a telegraph transmitter, a character member frame and setting mechanism concentrically mounted and adapted for movement independently of each other, character members movably mounted in said frame, a prime mover, gearing connecting both the setting mechanism and the character member frame with the prime mover, means carried by the character member frame for resisting said gearing to induce rotative tension in the setting mechanism and character member frame; and means for actuating individual character members.

157. In a telegraph transmitter, a character member frame and setting mechanism concentrically mounted and adapted for movement independently of each other, character members movably mounted in said frame, a prime mover, gearing connecting both the setting mechanism and the character member frame with the prime mover and including a transmission member having eccentric mounting on one of the concentrically mounted parts, and means for resisting said gearing whereby rotative tension is exerted on said part simultaneously with the driving tension on the character members.

158. In a telegraph transmitter, a character member frame and setting mechanism concentrically mounted and adapted for movement independently of each other, character members movably mounted in said frame, a prime mover, gearing connected with the prime mover for driving the setting mechanism and character members and including a transmission member having eccentric mounting on the frame and setting mechanism respectively whereby rotative tension is exerted on the frame and setting mechanism simultaneously with the driving tension on the character members.

159. In a telegraph transmitter, a character member frame and setting mechanism concentrically mounted and adapted for movement independently of each other, character members movably mounted in said frame, a prime mover, gearing connecting both the setting mechanism and character members with the prime mover and including a transmission member having eccentric mounting on the frame and setting mechanism respectively whereby rotative tension is exerted on the frame and setting mechanism simultaneously with the driving tension on the character members.

160. In a telegraph transmitter, a character member frame and setting mechanism concentrically mounted and adapted for movement independently of each other, character members movably mounted in said frame, a prime mover, gearing connecting both the setting mechanism and character members with the prime mover and including a transmission member having eccentric mounting on the frame and setting mechanism respectively whereby opposite rotative tension is exerted on the frame and setting mechanism simultaneously with the driving tension on the character members.

161. The combination with a transmitting element comprising individual character members, of an independently operable setting element, means in the setting element for selectively positioning the character members, and means for inducing travel of the transmitting element with the setting element when a character member is positioned.

162. In a telegraph transmitter, a character member frame and setting mechanism having concentric mounting, character members eccentrically mounted in the frame and adapted to be positioned by the setting mechanism, and a prime mover adapted for actuating the character members and including a transmission member having mounting on the setting mechanism whereby the setting mechanism and character member frame are yieldingly tensioned relative to each other.

163. In a telegraph transmitter, a character member frame and setting mechanism having concentric mounting and character members eccentrically mounted in the frame and adapted to be positioned by the setting mechanism, a prime mover adapted for actuating the character members and including a transmission member having mounting on the setting mechanism, and means on the character member frame for resisting the prime mover whereby the setting mechanism and character member frame are yieldingly tensioned relative to each other.

164. In a telegraph transmitter, a character member frame and setting mechanism having concentric mounting, character members eccentrically mounted in the frame and adapted to be positioned by the setting mechanism, a prime mover adapted for actuating the character members and including a transmission member having mounting on the setting mechanism, means on the character member frame for resisting the prime mover, whereby the setting mechanism and character member frame are yieldingly tensioned relative to each other, and an escapement for controlling the travel of the setting mechanism.

165. In a telegraph transmitter, a character member frame and setting mechanism having concentric mounting and character members eccentrically mounted in the frame, and adapted to be positioned by the setting mechanism, a prime mover adapted for actuating the character members and including a transmission member having eccentric mounting on the setting mechanism, means on the character member frame for resisting the prime mover; whereby the setting mechanism and character member frame are yieldingly tensioned relative to each other, an escapement for controlling the travel of the setting mechanism, and key levers for setting the setting mechanism and actuating said escapement.

166. In a telegraph transmitter, a character member frame and setting mechanism concentrically mounted one within the other, the latter comprising independent setting dogs and the former comprising independent character members and positioning devices adapted for actuation by the dogs, means for actuating the character members and for revolving the character member frame and setting mechanism, an escapement for controlling travel of the setting mechanism, and key members for setting said dogs and actuating the escapement.

167. The combination with transmitting and setting elements, both mounted for rotation independently of each other and on a common center, common means for driving the transmitting and setting elements, and a governor in the transmitting element for controlling the speed of travel of both elements.

168. In a telegraph transmitter, character mechanism comprising a driver and brush, a plurality of individually operative character members adapted for contact with the driver and brush, a revoluble drum, a gearing mounted concentrically with the drum and having transmission with the driver for actuating the character members, a prime mover, a gear wheel eccentrically mounted on the drum and connected with the concentric gear wheel and with the prime mover whereby the character member driver is actuated and radial tension exerted on the drum, and setting mechanism for controlling the actuation of individual character members.

169. In a telegraph transmitter, a character member frame and drum revolubly mounted on a common axis, a driving member carried by the frame, gears eccentrically mounted on the drum, a gear wheel mounted concentrically with the frame and drum and having operative connection with the drum member through the eccentrically mounted gears, an intermediate gear on said drum, a prime mover, a second gear wheel mounted concentrically with the frame and drum and operatively connected with the prime mover and with one of the eccentrically mounted gear wheels through said intermediate gear, whereby the character member driver is actuated and the frame and drum tensioned in opposite directions.

170. In a telegraph transmitter, a frame and a drum revolubly mounted on a common axis, hangers pivotally mounted in said frame, a driving member revolubly supported by said hangers, means for yieldingly tensioning said driving member toward operative position, character members adapted for operative engagement with said driving member, a gear wheel mounted concentrically with the frame and drum, operative connection between the said gear wheel and the driving member, a governor carried by said frame, a pin slidably mounted in the frame axis and extending to the exterior of the drum, and means operable by said pin for controlling said governor.

171. In a telegraph transmitter, a storage element, a plurality of individually operable character members, individually movable to set position, selectively from the storage element, a common driver for said character members, a prime mover, means for actuating the storage element and driver differentially from the same prime mover, and governor mechanism for controlling speed of the driver.

172. In a telegraph transmitter, the combination with storage, transmitting and character elements, of a differential gearing for simultaneously tensioning said storage and transmitting elements and actuating said character element, and means for yieldingly actuating said gearing.

173. In a telegraph transmitter, the combination with storage, transmitting and character elements, a brush operable from said character elements and a circuit closer operable from said brush, of a differential gearing for simultaneously tensioning the storage and transmitting elements and actuating said character elements to transmit telegraphic characters, and means for yieldingly actuating said gearing.

174. In a telegraph transmitter, the combination with storage, transmitting and character elements, of a differential gearing for actuating said character element and tensioning said storage and transmitting elements in opposite directions irrespective of the speed of said character element, and yielding means for tensioning said gearing.

175. In a telegraph transmitter, the combination with storage and transmitting elements and a character element operable from said storage element, means for shifting the transmitting element relative to the storage element to repeat the operation of the character element, and a keyboard for actuating said storage element, of a differential gearing for tensioning said storage element, and means for yieldingly actuating said gearing whereby the keyboard may be operated while the transmitting element is in repeat position.

176. In a telegraph transmitter, a revoluble storage cylinder, a revoluble character member adapted for travel in a circular orbit within said cylinder, a circuit closer adapted for travel in the same orbit as the character member and for actuation by said character member to produce telegraphic characters, and means for conducting an electric current through said revoluble cylinder to said revoluble circuit closer, substantially as and for the purpose set forth.

177. In a telegraph transmitter, a stationary support, a circuit terminal grounded on said support, a character mechanism revolubly mounted in said support and comprising individually operative character members, and a brush, a movable contact bracket carried by said mechanism and insulated from but adapted for actuation by the brush, a contact member carried by but insulated from the revoluble character mechanism, a brush having insulated mounting on the stationary support and contacting said contact member, and a circuit terminal insulated from the support and connected with said last named brush.

178. In a telegraph transmitter, the combination with a suitable support, of a character member frame and setting mechanism revoluble independently of each other, independently operable character members, mounted in said frame, a brush adapted for actuation by the character members, a contact bracket carried by and insulated from said frame, a contact member carried by and insulated from the setting mechanism, a brush carried by said bracket and wiping the contact member in the setting mechanism, a brush carried by and insulated from the support and wiping the contact member in the setting mechanism, a terminal having grounded connection through the support with the character members, and a terminal insulated from the support and connected with said last named brush.

179. In a telegraph transmitter, a revoluble character member frame, character members in said frame, a driver exterior to the frame, transmission between the driver and character members, a governor within said frame for controlling speed of said transmission, and means for setting said governor for predetermined speeds.

180. In a telegraph transmitter, an inclosing case, a character member frame revolubly mounted within the case, character members carried by said frame, setting mechanism for said character members, a driver, transmission between the character members and driver, a governor for controlling speed of said transmission, means extending exterior to the case for controlling said governor, and means in said frame for setting said governor for a predetermined speed.

181. In a telegraph transmitter, an inclosing case, a character member frame revolubly mounted within the case, character members in said frame, a driver, transmission between the driver and character members, a governor for controlling speed of said transmission, and means for controlling said governor comprising a lever and a rod extending through the axis of said frame.

182. In a telegraph transmitter, an inclosing case, a character member frame revolubly mounted within the case, character members in said frame, a driver, transmission between the driver and character members, a governor for controlling speed of said transmission, means for controlling said governor comprising a lever, a rod extending through the axis of said frame, a handle member on said case for actuating the rod, and a stop for said handle member.

183. In a telegraph transmitter, an inclosing case, a character member frame revolubly mounted within the case, character members in said frame, a driver, transmission between the driver and character members, a governor for controlling speed of said transmission, means for controlling said governor comprising a lever, a rod extending through the axis of said frame, a handle member on said case for actuating said rod, an indicator, and a stop adjustably connected with said indicator and adapted for limiting travel of said handle member.

184. In a telegraph transmitter, an inclosing case, a character member frame revolubly mounted within the case, character members in said frame, a driver, transmission between the driver and character members, a governor for controlling speed of said transmission, means for controlling said governor comprising a lever, a rod extending through the axis of said frame, a handle member having a cam adapted for actuating said rod, an indicator having a notched flange, a stop having a tooth adapted for contact with the notched flange, and a pointer connected with said handle and adapted for engaging said stop.

185. In a telegraph transmitter, a character member frame, character members contained within the frame, setting mechanism adapted for positioning the character members, key levers for actuating the setting mechanism, bars adapted for actuation by said key levers, a track connected with said bars, a tram adapted for travel on said track, means connecting opposite ends of the tram with said character member frame, a pointer connected with said tram, a member on said track, and a pivotally mounted member adapted for engagement by the tram and for movement into coöperative relation with the track member to hold said key levers in inoperative position.

186. In a telegraph transmitter, a storage element, a transmitting element, a character element, means for tensioning said elements, a keyboard including space and character keys for releasing said storage element to the tensioning means, and a lock for simultaneously locking said space and character keys when the transmitting element has reached its maximum position.

187. In a telegraph transmitter, a storage element, a transmitting element, a character element, means for tensioning said elements, a keyboard including space and character keys for releasing said storage element to the tensioning means, means for supplementing the tension of said keys, and a lock for ultimately locking said space and character keys when the transmitting element has reached its maximum position.

188. In a telegraph transmitter, a transmitting element comprising a character member and positioning device, a rotatable drum inclosing the transmitting element and having a series of circumferential openings, a setting dog pivotally mounted in each of said openings and having toothed members projected inwardly and outwardly from the drum, means for yieldingly retaining each dog member at either limit of its travel, and key mechanism for setting a dog on its primary movement and returning a previously set dog on its return movement.

189. In a telegraph transmitter, a transmitting element comprising character members and positioning devices, a setting element comprising setting dogs for the positioning devices, means for setting said dogs, means for actuating the setting element, an erase key lever, and means operable by the lever for inducing reverse movement of the setting element and returning said dogs to initial position.

190. In a telegraph transmitter, a transmitting element comprising positioning devices, a setting element comprising setting dogs for the positioning devices, means for actuating the setting element, an escapement for controlling the movement of the setting element, key levers for setting the dogs and releasing the escapement, a ratchet in the actuating mechanism, and an erase key lever having a pawl for operatively engaging the ratchet to reverse the actuating mechanism and escapement.

191. In a telegraph transmitter, independently operable transmitting and setting mechanisms, means for locking the said mechanisms together to effect synchronous operation thereof, character members in the transmitting mechanism, and means operable by the character members controlling said locking means.

192. In a telegraph transmitter, transmitting and setting elements, one movable relative to the other, individual character members in the transmitting element, trip mechanism for setting the character members, means for actuating the transmitting and setting elements independently of each other and at different speeds, means for setting the setting element irrespective of operation of the transmitting element, and escapement mechanism for locking the transmitting and setting elements together for each operative phase of the transmitting element.

193. In a telegraph transmitter, transmitting and setting elements movable independently of each other, individual character members in the transmitting element, a positioning mechanism for each character member, a series of setting dogs in the setting element for each positioning mechanism, individual means for actuating any of the setting dogs in the series, escapement mechanism operable by the positioning mechanism for locking the elements together, means for moving the said elements synchronously, and means for moving the transmitting element during its free period to bring the positioning mechanism into operative relation to set dogs.

194. In a telegraph transmitter, transmitting and setting elements movable independently of each other, individual character members in the transmitting element, a positioning mechanism for each character member, a series of setting dogs in the setting element for each positioning mechanism, individual means for actuating any of the dogs in a series, escapement mechanism operable by the positioning mechanism for locking the elements together, means for moving the said elements synchronously, and means for moving the setting element during a locked period of the transmitting element, whereby selected dogs may be set during the locked period of the transmitting element.

195. In a telegraph transmitter, transmitting and setting elements movable independently of each other, individual character members in the transmitting element, a positioning mechanism for each character member, a series of setting dogs in the setting element for each positioning mechanism, individual means for actuating any of the dogs in a series, escapement mechanism operable by the positioning mechanism for locking the elements together, and means for moving the said elements simultaneously and independently of each other, whereby setting dogs may be set in storage during locked periods of the transmitting element and taken up by the positioning mechanism during movable periods of said element.

196. In a telegraph transmitter, a storage element, a transmitting element, character elements in said transmitting element operable from said storage element, means for differentially driving said elements to transmit telegraphic characters in the proper time and sequence, and means for disengaging the driving means from the transmitter and character elements and moving said elements around a functional part of the storage element to eliminate the characters in storage.

197. In a telegraph transmitter, a storage element, a transmitting element, character elements in said transmitting element, means for differentially driving all of said elements, and a governor for regulating the speed of the character elements independently of the speed of the storage or transmitting elements to transmit telegraphic characters.

198. In a telegraph transmitter, a storage element, a transmitting element, character elements in said transmitting element, means for differentially driving all of said elements, to transmit telegraphic characters, a governor for regulating the speed of said character elements, and means for locking said driving means, disengaging said governor and turning said transmitting element relative to the storage element to repeat said characters.

199. In a telegraph transmitter, a movable storage element, a movable transmitting element, a movable character element in said transmitting element, means for differentially driving all of said elements to transmit telegraphic characters, a governor for regulating the speed of said character element, and fixed means projected into said movable storage and transmitting elements for regulating the speed of said governor.

200. In a telegraph transmitter, the combination with a storage element and transmitting and character elements, operable from said storage element to transmit telegraphic characters, of a differential gearing for actuating said elements, and means for actuating said gearing.

201. In a telegraph transmitter, the combination with a storage element and transmitting and character elements operable from said storage element to transmit telegraphic characters, of a differential gearing for actuating said character element when said storage and transmitting elements are locked together and means for actuating said gearing.

202. In a telegraph transmitter, the combination with a storage element and transmitting and character elements operable from said storage element to transmit telegraphic characters, of a differential gearing for actuating the storage element when the transmitting and character elements are locked, and means for actuating said gearing.

203. In a telegraph transmitter, the combination with storage, transmitting, and character elements, of a differential gearing for actuating the storage and transmitting elements in the same direction when the character element is locked, and means for actuating said gearing.

204. In a telegraph transmitter, the combination with storage, transmitting and character elements, of a differential gearing for actuating the storage and transmitting elements in opposite directions when the character element is free and means for actuating said gearing.

205. In a telegraph transmitter, storage and transmitting frames movable idly in opposite directions, individually operable character members in the transmitting frame, a plurality of setting dogs in the storage frame for each character member, means for setting any of said setting dogs to select a character member for operation, means operable by a set dog to position the selected character member, means for locking said positioning means to the storage frame during operation of the character member, a driver for selected character members, and circuit making and breaking mechanism operable by driven character members.

206. In a telegraph transmitter, a plurality of character members, having character and correction portions, means for operating the character members, and a correcting device set in motion by the correction portion of a character member and operable by said member to position the same.

207. The combination of transmitting and setting elements each rotatively movable relative to the other, a plurality of character members in the transmitting element having individual positioning movement and functional movement independently of the positioning movement and of movement of the transmitting element in mass, means for operating positioned character members and means in the setting element for selectively operating the character members.

208. In a device of the character described, a floating carriage, an independently movable character member frame, setting devices mounted in the carriage, a character member mounted in the frame, means carried by the frame and normally locking the character member and adapted for actuation by the setting devices to release the character member, and means for controlling travel of the carriage and frame.

209. In a telegraph transmitter, a storage element, a transmitting element, a single prime mover for said element, normally driving the elements in opposite directions, positioning members in the transmitting element selectively settable from the storage element, means for locking set positioning members in the storage element whereby the storage and transmitting elements are driven at the same speed and in the same direction during transmitting periods, character members on the positioning members, and means operable by the prime mover for driving the character members on set positioning members.

210. In a telegraph transmitter, a storage element, means for producing a record in said element, a transmitting element adapted for rotation past said storage element, character members in said transmitting element, means in the storage element for positioning the character members, and means for actuating positioned members to effect transmission.

211. In a device of the character described, transmitting and setting mechanisms adapted for revolution on a common axis; a common driver whereby said mechanisms are moved simultaneously in opposite directions; and means controlled by said transmitting mechanism for effecting travel thereof with the setting mechanism.

212. In a device of the character described, setting mechanism, means for tensioning said mechanism, means for restraining said mechanism, means for releasing said mechanism to its tension, a character member frame, means carried by the setting mechanism for moving the character member frame in the direction of movement of the setting mechanism, character members in said frame, a prime mover for actuating the character members and the setting mechanism, and transmission between the prime mover and character members whereby a set character member is actuated independently of the general actuation of all of said character members.

213. In a device of the character described, character mechanism including individually operative character members, a setting mechanism, a prime mover and transmission between the prime mover and the character members whereby a set character member is actuated and mechanism controlled by the character members for moving all of the members and the setting mechanism relatively to each other.

214. In combination with a transmitting element, comprising a positioning device and corresponding character member, a movable carriage, a series of independently movable setting dogs in said carriage, each adapted for actuating the positioning device when in set position, means for setting any of said dogs, means for actuating the transmitting element relative to the carriage to induce engagement of a set dog with the positioning device, and means for moving the character member independently of the positioning device and carriage.

215. In a telegraph transmitter, character members, a setting mechanism and a circuit maker and breaker, the character members having collective movement relative to the setting mechanism and individual movement relative to the circuit maker and breaker, a prime mover for effecting movement of the setting mechanism and collective movement of the character members, and transmission between the prime mover and the character members for effecting individual movement of said members.

216. In a telegraph transmitter, transmitting and storage elements, movable in opposite directions, character mechanism movable in the transmitting element comprising a carrier and a character member movable on the carrier, setting devices in the storage element operable on the carrier to position the character member, an escapement controlling movement of the storage element, means for setting the setting devices and actuating the escapement, and means for operating the positioned character member independently of movement of the storage element.

217. In a telegraph transmitter, a prime mover, a differential gearing operable from the prime mover and comprising two intermittent outlets and one governor controlled outlet, a storage cylinder controlled by one intermittent outlet, a transmitting element controlled by the second intermittent outlet, character members in said transmitting element and means operable from said governor controlled outlet for driving said character members to transmit telegraphic characters.

218. In a telegraph transmitter, a prime mover, a differential gearing operable from the prime mover and comprising two intermittent outlets and one governor controlled outlet, a storage cylinder operable from one of said intermittent outlets, a transmitting element operable from the second intermittent outlet, a circuit closer and a character member operable from said governor controlled outlet for actuating said circuit closer.

219. In a telegraph transmitter, a prime mover, a differential gearing operable from the prime mover, and having two escapement locked power outlets and one governor locked power outlet, a storage cylinder held by one escapement locked power outlet, a transmitting element held by the second escapement locked power outlet, character members in said transmitting element and means for holding said character members by the governor locked power outlet during the inactive period of the telegraph transmitter.

220. In a telegraph transmitter, differential driving mechanism, comprising co-axial gears, a planetary gear for each of said co-axial gears, an idler between one of said planetary gears and one of said co-axial gears, means for driving one of said co-axial gears to drive said planetary gears in orbits of opposite rotation, a setting element driven from one planetary gear, and a transmitting element driven from the other planetary gear.

221. In a telegraph transmitter, differential driving mechanism comprising two co-axial gears, a planetary gear unit comprising two gears adapted to rotate together and an idle gear, one of said planetary gears being adapted to mesh with one of said co-axial gears, the other of said planetary gears being connected to said other co-axial gear through said idle gear, a second planetary gear adapted to mesh with said second co-axial gear, means for driving said first co-axial gear to drive said planetary gears in orbits of opposite rotation, a setting element operable by one planetary gear and a transmitting element operable by the other planetary gear.

222. In a telegraph transmitter, differential driving mechanism comprising two co-axial gears, a planetary gear adapted to mesh with the first of said co-axial gears, another planetary gear, an idler for connecting said last named planetary gear with said first co-axial gear, a gear adapted to turn with said last named planetary gear and adapted to mesh with the second co-axial gear, means for driving said second co-axial gear to drive said planetary gears in orbits of opposite rotation, a setting element operable by one planetary gear, and a transmitting element operable by the other planetary gear.

223. In a telegraph transmitter, differential driving mechanism comprising two co-axial gears, a planetary gear, an idler connecting said planetary gear with one of said co-axial gears, a second planetary gear meshing with said co-axial gear, a gear connected with said first planetary gear and meshing with the second co-axial gear, means for driving the second co-axial gear to drive said planetary gears in orbits of opposite rotation, a governor on one of said planetary gears for controlling the motion at which that planetary gear travels through its orbit, a setting element operable by one of the planetary gears and a transmitting element operable by the other planetary gear.

224. In a telegraph transmitter, differential driving mechanism comprising two co-axial gears, a planetary gear, an idler connecting said planetary gear with one of said co-axial gears, a second planetary gear meshing with said co-axial gear, a part of said first planetary gear meshing with the second co-axial gear, means for driving the second co-axial gear to drive said planetary gears in orbits of opposite rotation, a governor on the second planetary gear for controlling the motion at which that planetary gear travels through its orbit, a setting element operable by the first planetary gear and a transmitting element operable by the second planetary gear.

225. In a telegraph transmitter, a setting element, a transmitting element, a differential driving mechanism for said elements comprising two co-axial gears, a planetary gear on said setting element comprising two gear wheels, one meshing with one of said co-axial gears, an idler connected with the other gear wheel, a second co-axial gear, a second planetary gear on said transmitting element meshing with the second co-axial gear, a governor, gearing connecting the governor and said second planetary gear and means for driving the first co-axial gear to drive said transmitting element.

226. In a telegraph transmitter, setting and transmitting elements, a differential driving mechanism comprising co-axial and planetary gears, one of said planetary gears being mounted on the setting element and adapted to rotate in an orbit around and in operative relation with the co-axial gears, to furnish rotative tension to the setting element, a second planetary gear mounted on the transmitting element in operative relation with a co-axial gear to furnish rotative tension in the opposite direction and tension controlled driving means for the co-axial gears.

227. In a telegraph transmitter, setting and transmitting elements, a differential driving mechanism comprising co-axial gears, a planetary gear on the setting element and operatively connected with the co-axial gears to furnish rotative tension to effect movement of the transmitting element in one direction, a planetary gear on the transmitting element operatively connected with one co-axial gear to furnish rotative tension to effect movement of the transmitting element in the opposite direction, tension controlled means for furnishing power to the co-axial gears, escapement for controlling the setting element and a governor for controlling the second planetary gear for regulating the speed of the transmitting element.

228. In a telegraph transmitter, setting and transmitting elements, a differential driving mechanism comprising co-axial gears, a planetary gear on the setting element operable from one of the co-axial gears to furnish rotative tension of the setting element in one direction, a planetary gear on the transmitting element operable from a second one of the co-axial gears, a governor for resisting said planetary gear on the transmitting element to furnish rotative tension to the transmitting element and tension controlled driving means for driving the first one of the co-axial gears.

229. In a telegraph transmitter, setting and transmitting elements, a differential driving mechanism comprising co-axial gears, a planetary gear on the setting element operable from one of said co-axial gears to furnish rotative tension in one direction, a planetary gear on the transmitting element connected with a second one of said co-axial gears, a plurality of character members in the transmitting element, a clash gear in the transmitting element for driving said character members at times, a governor in the transmitting element, gearing connecting the governor, clash gear and second planetary gear in operative relation, and driving means for the co-axial gears to furnish rotative tension to the transmitting element.

230. In a telegraph transmitter, a transmitting element having a character member, a storage element having setting dogs for functioning said character member and an escapement on the said transmitting element automatically operable relative to the character member.

231. In a telegraph transmitter, a transmitting element having a plurality of character members, a storage element having a plurality of setting dogs for selecting and successively functioning said character members and an escapement on the transmitting element automatically operable to space characters in the proper time and sequence.

232. In a telegraph transmitter, a transmitting element, a plurality of characters in said element, a storage element, a plurality of setting dogs in the storage element, a keyboard for manually functioning said dogs to form a record, means for moving the transmitting element relative to the storage element to set a character and an escapement on the transmitting element operable from the character member to release said transmitting element to its movement relative to the storage element.

233. In a telegraph transmitter, a transmitting element, a plurality of character members in said transmitting element, an escapement and a storage element for functioning said character members and automatically operating said escapement for the purpose set forth.

234. In a telegraph transmitter, a storage element, a manually controlled escapement for intermittently forwarding said element, a transmitting element operable from said storage element and an escapement on said transmitting element indirectly controllable by said storage escapement for forwarding the transmitting element.

235. In combination with a plurality of individually operable carriers, a character member on each carrier movable independently thereof, storage mechanism comprising a plurality of setting devices for each carrier, means for selectively setting the setting devices to position the carriers, a driver for character members on positioned carriers, a latch operable by each character member to retain the carrier in position and to release the carrier when a phase of operation of said member is completed, and a functioning element operable by said character member.

236. In combination with a transmitting element, a storage element, comprising a record for selectively acting on the transmitting element, the transmitting element being movable around a portion of the record in the storage element to eliminate or repeat the circumscribed portion.

237. In a telegraph transmitter, storage and transmitting elements, movable relative to each other, character members in the transmitting element, means operating selected character members, means in the storage element for selecting characters for operation, means for eliminating said selecting means in part, and an indicator operable by the eliminating means to indicate the elimination.

238. In a telegraph transmitter comprising character members, a setting element comprising individually operable setting members, means operating the setting element in one direction to function said setting members to position said character members, key mechanism for controlling said functioning means, means operating the setting element in the opposite direction to defunction said setting members to prevent corresponding character members from being positioned, an erase key for controlling said defunctioning means, and means for driving positioned character members to transmit telegraphic characters.

239. In a telegraph transmitter, storage and transmitting elements, means for differentially driving said elements to produce telegraphic characters, and an indicator whereby the length of each character may be determined.

In testimony whereof, I affix my signature.

EDWIN H. PIERSEN.